US008713704B2

(12) United States Patent
Davis et al.

(10) Patent No.: US 8,713,704 B2
(45) Date of Patent: *Apr. 29, 2014

(54) BEHAVIORAL FINGERPRINT BASED AUTHENTICATION

(75) Inventors: Marc E. Davis, San Francisco, CA (US);
Matthew G. Dyor, Bellevue, CA (US);
Daniel A. Gerrity, Seattle, WA (US);
Xuedong Huang, Bellevue, WA (US);
Roderick A. Hyde, Redmond, WA (US);
Royce A. Levien, Lexington, MA (US);
Richard T. Lord, Tacoma, WA (US);
Robert W. Lord, Seattle, WA (US);
Mark A. Malamud, Seattle, WA (US);
Nathan P. Myhrvold, Bellevue, WA (US); Clarence T. Tegreene, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,564

(22) Filed: May 18, 2012

(65) Prior Publication Data

US 2013/0104203 A1    Apr. 25, 2013

Related U.S. Application Data

(63) Continuation-in-part of application No. 13/373,685, filed on Nov. 23, 2011, and a continuation-in-part of application No. 13/373,684, filed on Nov. 23, 2011, and a continuation-in-part of application No. 13/373,680, filed on Nov. 23, 2011, and a continuation-in-part of application No. 13/373,677, filed on Nov. 23, 2011, and a continuation-in-part of application No. 13/373,682, filed on Nov. 23, 2011.

(60) Provisional application No. 61/632,836, filed on Sep. 24, 2011, provisional application No. 61/572,309, filed on Oct. 13, 2011.

(51) Int. Cl.
*G06F 12/14*    (2006.01)
*G06F 21/62*    (2013.01)
*H04L 9/32*    (2006.01)
*H04L 29/06*    (2006.01)

(52) U.S. Cl.
CPC ............... *G06F 21/62* (2013.01); *H04L 63/102* (2013.01)
USPC ............................... 726/28; 726/29; 713/166

(58) Field of Classification Search
None
See application file for complete search history.

(56) References Cited

U.S. PATENT DOCUMENTS 7,433,960 B1 * 10/2008 Dube et al. .................... 709/229
7,577,987 B2    8/2009 Mizrah (Continued)

OTHER PUBLICATIONS

Trejo et al.; "Using Cloud Computing MapReduce operations to Detect DDoS Attacks on DNS servers"; Proceedings of the 4th Iberian Grid Infrastructure Conference; pdf created Mar. 1, 2013; pp. 1-13.

(Continued)

Primary Examiner — Venkat Perungavoor

(57) ABSTRACT

A computationally-implemented method, for certain example embodiments, may include, but is not limited to: determining that a first user of a computing device is associated with the computing device; and determining a level of authentication associated with the first user via the computing device, the level of authentication at least partially based on a behavioral fingerprint. A level of authentication determination may additionally/alternatively include at least determining a behavioral fingerprint via establishing a statistical predictability of one or more future actions of an authorized user of a computing device. A level of authentication determination may additionally/alternatively include at least determining an authentication level with respect to a computing device at least partially based on a behavioral fingerprint determined from interaction(s) with another device. In addition to the foregoing, other example aspects are described in the claims, drawings, and written description forming a part of the present disclosure.

35 Claims, 12 Drawing Sheets

(56) References Cited

U.S. PATENT DOCUMENTS

| | | | |
|---|---|---|---|
| 7,689,418 B2 * | 3/2010 | Ramaswamy et al. | 704/250 |
| 7,827,592 B2 | 11/2010 | Fifer et al. | |
| 7,975,150 B1 | 7/2011 | Lillibridge et al. | |
| 8,020,005 B2 | 9/2011 | Mani et al. | |
| 8,051,468 B2 | 11/2011 | Davis et al. | |
| 8,155,999 B2 | 4/2012 | de Boer et al. | |
| 8,161,530 B2 | 4/2012 | Meehan et al. | |
| 8,290,908 B2 | 10/2012 | McCarthy et al. | |
| 8,316,237 B1 | 11/2012 | Felsher et al. | |
| 8,392,969 B1 | 3/2013 | Park et al. | |
| 2002/0046105 A1 | 4/2002 | Gardenswartz et al. | |
| 2005/0071643 A1 | 3/2005 | Moghe | |
| 2005/0100198 A1 | 5/2005 | Nakano et al. | |
| 2006/0020814 A1 | 1/2006 | Lieblich et al. | |
| 2006/0133651 A1 | 6/2006 | Polcha et al. | |
| 2006/0224898 A1 | 10/2006 | Ahmed | |
| 2007/0067853 A1 | 3/2007 | Ramsey | |
| 2007/0245157 A1 | 10/2007 | Giobbi et al. | |
| 2007/0245158 A1 | 10/2007 | Giobbi et al. | |
| 2007/0250550 A1 | 10/2007 | Berninger | |
| 2008/0091453 A1 | 4/2008 | Meehan et al. | |
| 2008/0092209 A1 | 4/2008 | Davis et al. | |
| 2008/0098456 A1 | 4/2008 | Alward et al. | |
| 2009/0006846 A1 | 1/2009 | Rosenblatt | |
| 2009/0025081 A1 | 1/2009 | Quigley et al. | |
| 2009/0070435 A1 | 3/2009 | Abhyanker | |
| 2009/0298514 A1 | 12/2009 | Ullah | |
| 2010/0073202 A1 | 3/2010 | Mazed | |
| 2010/0115592 A1 | 5/2010 | Belz et al. | |
| 2010/0115610 A1 | 5/2010 | Tredoux et al. | |
| 2010/0169343 A1 | 7/2010 | Kenedy et al. | |
| 2010/0174709 A1 * | 7/2010 | Hansen et al. | 707/728 |
| 2010/0186066 A1 | 7/2010 | Pollard | |
| 2010/0299292 A1 | 11/2010 | Collazo | |
| 2010/0319053 A1 | 12/2010 | Gharabally | |
| 2011/0016534 A1 | 1/2011 | Jakobsson et al. | |
| 2011/0072487 A1 | 3/2011 | Hadar et al. | |
| 2011/0145927 A1 | 6/2011 | Hubner et al. | |
| 2011/0196926 A1 | 8/2011 | Crawford | |
| 2011/0238482 A1 | 9/2011 | Carney et al. | |
| 2011/0239276 A1 | 9/2011 | Garcia Garcia et al. | |
| 2011/0251823 A1 | 10/2011 | Davis et al. | |
| 2011/0276486 A1 | 11/2011 | Kuba | |
| 2011/0302640 A1 | 12/2011 | Liu et al. | |
| 2011/0314559 A1 * | 12/2011 | Jakobsson | 726/28 |
| 2011/0321157 A1 | 12/2011 | Davis et al. | |
| 2012/0131034 A1 | 5/2012 | Kenedy et al. | |
| 2012/0136936 A1 | 5/2012 | Quintuna | |
| 2012/0137340 A1 | 5/2012 | Jakobsson et al. | |
| 2012/0144468 A1 | 6/2012 | Pratt et al. | |
| 2012/0198532 A1 | 8/2012 | Headley | |
| 2012/0284779 A1 | 11/2012 | Ingrassia, Jr. et al. | |
| 2012/0323685 A1 | 12/2012 | Ullah | |
| 2013/0013404 A1 | 1/2013 | Suprock et al. | |
| 2013/0019289 A1 | 1/2013 | Gonser et al. | |
| 2013/0036458 A1 | 2/2013 | Liberman et al. | |
| 2013/0036459 A1 | 2/2013 | Liberman et al. | |
| 2013/0042327 A1 | 2/2013 | Chow | |
| 2013/0054433 A1 | 2/2013 | Giard et al. | |
| 2013/0055367 A1 | 2/2013 | Kshirsagar et al. | |
| 2013/0061285 A1 | 3/2013 | Donfried et al. | |
| 2013/0097669 A1 | 4/2013 | Davis et al. | |
| 2013/0097673 A1 | 4/2013 | Meehan et al. | |
| 2013/0097683 A1 | 4/2013 | Davis et al. | |
| 2013/0102283 A1 | 4/2013 | Lau et al. | |
| 2013/0133052 A1 | 5/2013 | Davis et al. | |
| 2013/0133054 A1 | 5/2013 | Davis et al. | |
| 2013/0167207 A1 | 6/2013 | Davis et al. | |

OTHER PUBLICATIONS

Xie et al.; "Privacy-Preserving Matchmaking for Mobile Social Networking Secure Against Malicious Users"; 2011 Ninth Annual International Conference on Privacy, Security and Trust; bearing a date of Jul. 11, 2011; pp. 1-8; IEEE.

Brainard, John; Juels, Ari; Rivest, Ronald L.; Szydlo, Michael; Yung, Moti; "Fourth-Factor Authentication: Somebody You Know"; ACM CCS; 2006; pp. 168-178; Alexandria, Virginia.

Diep, Francie; "Your finger swipe could become your password"; NBC News Future Tech; Oct. 2, 2012; http://www.nbcnews.com/technology/futureoftech/your-finger-swipe-could-become-your-password-6215845.

Gianchandani, Erwin; "Darpa Seeking to Develop a Cognitive Fingerprint"; Computing Community Consortium Blog; Jan. 27, 2012; http://www.cccblog.org/2012/01/27/darpa-seeking-to-develop-a-cognitive-fingerprint/.

Jacobs, Tom; "Identity Protection That Really Clicks"; Pacific Standard Magazine; May 3, 2012; http://www.psmag.com/business-economics/identity-protection-that-really-clicks-42048/.

Jorgensen, Zach; Yu, Ting; "On Mouse Dynamics as a Behavioral Biometric for Authentication"; 2011; pp. 476-482; Department of Computer Science, North Carolina State University; Releigh, North Carolina.

Riva, Oriana; Qin, Chuan; Strauss, Karin; Lymberopoulos, Dimitrios; "Progressive authentication: deciding when to authenticate on mobile phones"; Microsoft Research; Aug. 8, 2012; http://research.mircosoft.com/apps/pubs/default/aspx?id =168102.

U.S. Appl. No. 13/373,682, Davis et al.

PCT International Search Report; International App. No. PCT/US13/48664; Dec. 3, 2013; pp. 1-3.

* cited by examiner

102/102a Level of Authentication Module

- 210 Behavioral Fingerprint Interaction Module
  - 212 Anomalous Action Detecting Module
  - 216 Social Network Confirmation Module

- 218 Statistical Level Determination Module

- 220 Visual Cue Detecting Module
  - 222 Face Detecting Module

- 226 Audio Cue Detecting Module
  - 227 Voice Pattern Detecting Module

- 230 Geographic Location Determination Module/ GPS

FIG. 2b

BEHAVIORAL FINGERPRINT BASED AUTHENTICATION

CROSS REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC 119(e) for provisional patent applications, for any and all parent, grandparent, great-grandparent, etc. applications of the Priority Application(s)). In addition, the present application is related to the "Related Applications," if any, listed below.

PRIORITY APPLICATIONS (1) For purposes of the USPTO extra-statutory requirements, the present application claims benefit of priority of United States Provisional Patent Application No. 61/632,836, entitled "Behavioral Fingerprint Based Authentication", naming Marc E. Davis, Matthew G Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Sep. 24, 2011, which was filed within the twelve months preceding the filing date of the present application or is an application of which a currently co-pending application is entitled to the benefit of the filing date.

(2) For purposes of the USPTO extra-statutory requirements, the present application claims benefit of priority of U.S. Provisional Patent Application No. 61/572,309, entitled "Network-Acquired Behavioral Fingerprint for Authentication", naming Marc E. Davis, Matthew G Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Oct. 13, 2011, which was filed within the twelve months preceding the filing date of the present application or is an application of which a currently co-pending application is entitled to the benefit of the filing date.

(3) For purposes of the USPTO extra-statutory requirements, the present application constitutes a continuation-in-part of U.S. patent application Ser. No. 13/373, 685, entitled "Behavioral Fingerprint Device Identification", naming Marc E. Davis, Matthew G Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Nov. 23, 2011, which is currently co-pending; or is an application of which a currently co-pending application is entitled to the benefit of the filing date.

(4) For purposes of the USPTO extra-statutory requirements, the present application constitutes a continuation-in-part of U.S. patent application Ser. No. 13/373, 684, entitled "Behavioral Fingerprint Controlled Automatic Task Determination", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Nov. 23, 2011, which is currently co-pending or is an application of which a currently co-pending application is entitled to the benefit of the filing date.

(5) For purposes of the USPTO extra-statutory requirements, the present application constitutes a continuation-in-part of U.S. patent application Ser. No. 13/373, 680, entitled "Behavioral Fingerprint Controlled Theft Detection and Recovery", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Nov. 23, 2011, which is currently co-pending; or is an application of which a currently co-pending application is entitled to the benefit of the filing date.

(6) For purposes of the USPTO extra-statutory requirements, the present application constitutes a continuation-in-part of U.S. patent application Ser. No. 13/373, 677, entitled "Trust Verification Schema Based Transaction Authorization", naming Marc E. Davis, Matthew G Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Nov. 23, 2011, which is currently co-pending or is an application of which a currently co-pending application is entitled to the benefit of the filing date.

(7) For purposes of the USPTO extra-statutory requirements, the present application constitutes a continuation-in-part of U.S. patent application Ser. No. 13/373, 682, entitled "Social Network Based Trust Verification Schema", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Nov. 23, 2011, which is currently co-pending or is an application of which a currently co-pending application is entitled to the benefit of the filing date.

RELATED APPLICATIONS

None.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designations are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

FIELD OF INVENTION

This invention relates generally to the field of authentication for computing devices.

SUMMARY

For certain example embodiments, a computationally-implemented method may include, but is not limited to: determining that a first user of a computing device is associated with the computing device; and determining a level of authentication associated with the first user via the computing device, the level of authentication at least partially based on a behavioral fingerprint. In addition to the foregoing, other example method aspects are described in the claims, drawings, and written description forming a part of the present disclosure.

In one or more various aspects, related systems include but are not limited to circuitry and/or programming for effecting the herein referenced method aspects; the circuitry and/or programming can be virtually any combination of hardware, software, and/or firmware in one or more machines or articles of manufacture configured to effect the herein-referenced method aspects depending upon the design choices of the system designer.

For certain example embodiments, a computationally-implemented system may include, but is not limited to: means for determining that a first user of a computing device is associated with the computing device; and means for determining a level of authentication associated with the first user via the computing device, the level of authentication at least partially based on a behavioral fingerprint. In addition to the foregoing, other example system aspects are described in the claims, drawings, and written description forming a part of the present disclosure.

For certain example embodiments, a computationally-implemented system may include, but is not limited to: circuitry for determining that a first user of a computing device is associated with the computing device; and circuitry for determining a level of authentication associated with the first user via the computing device, the level of authentication at least partially based on a behavioral fingerprint. In addition to the foregoing, other example system aspects are described in the claims, drawings, and written description forming a part of the present disclosure.

For certain example embodiments, with at least one processor-accessible medium bearing processor-executable instructions, the processor-executable instructions may include, but are not limited to: one or more instructions for determining that a first user of a computing device is associated with the computing device; and one or more instructions for determining a level of authentication associated with the first user via the computing device, the level of authentication at least partially based on a behavioral fingerprint. In addition to the foregoing, other example computer program product aspects are described in the claims, drawings, and written description forming a part of the present disclosure.

For certain example embodiments, a computer program product comprises an article of manufacture that may bear, among other instructions: one or more instructions for determining that a first user of a computing device is associated with the computing device; and one or more instructions for determining a level of authentication associated with the first user via the computing device, the level of authentication at least partially based on a behavioral fingerprint. In addition to the foregoing, other example computer program product aspects are described in the claims, drawings, and written description forming a part of the present disclosure.

For certain example embodiments, a method may relate to authenticating through a computing device, with the method including determining that a first user of a computing device is associated with the computing device, wherein the determining that a first user of a computing device is associated with the computing device is performed via at least one of a machine, an article of manufacture, or a composition of matter; and determining a level of authentication associated with the first user via the computing device, the level of authentication at least partially based on a behavioral fingerprint, wherein the determining a level of authentication associated with the first user via the computing device is performed via at least one of a machine, an article of manufacture, or a composition of matter.

The foregoing summary is illustrative only and is not intended to be in any way limiting. In addition to the illustrative aspects, embodiments, and features described above, further aspects, embodiments, and features will become apparent by reference to, e.g., the drawings and the following detailed description.

BRIEF DESCRIPTION OF THE FIGURES

FIG. 2b shows another view of a level of authentication module 102/102a, in accordance with certain example embodiments.

DETAILED DESCRIPTION

Figure 1:
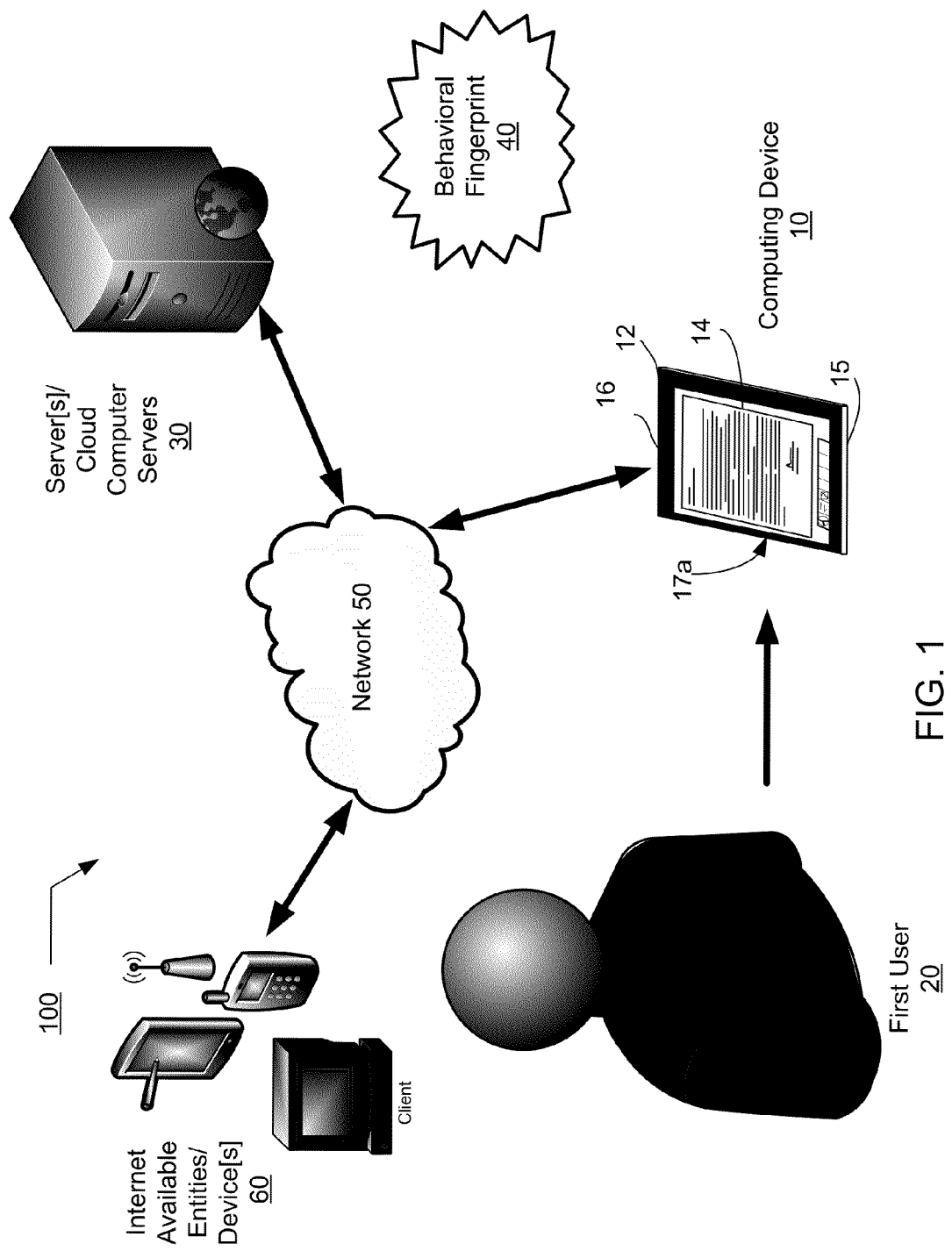
FIG. 1 shows a computer server 30 and a computing device 10 in an exemplary environment 100, in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Advances in computing technologies and related technologies (e.g., visual display technology, battery technology, etc.) resulted in the development of computing devices with tremendous processing power and relatively small form factors. Examples of such computing devices include, for example, laptops, Netbooks, tablet computers (e.g., "slate" computers), e-readers, smartphones, entertainment appliances, mobile device, and so forth. Having a small form factor with tremendous processing power presents numerous opportunities for developing applications that previously required desktop computers or other stationary devices. One problem with the numerous applications available on a small form factor is that authentication becomes paramount. For example, if an application enables a mobile phone or a smartphone or an electronic device, such as a key fob, to open doors to a home or car, it may be important to determine that the user of the device/phone/key fob/etc. is the true owner or otherwise an authorized user.

Certain example embodiments herein are directed to enabling authentication and/or verification to be determined based at least partially on a behavioral fingerprint of the true owner or other authorized user of a device.

In accordance with various example embodiments, computationally implemented methods, systems, devices, and articles of manufacture are provided that can determine a level of authentication of a first user of a computing device; and in response to determining the level of authentication, may automatically enable one or more actions as a function of the level of authentication. In various embodiments, such computationally implemented methods, systems, devices, and articles of manufacture may be implemented at a computing device and/or a computer server networked to a computing device.

Referring now to FIG. 1, the figure illustrates a computing device 10 that may be connected via a network interface to a computer server 30 in an exemplary environment 100. Computing device 10 is shown being operated by a first user 20. As will be further described herein the illustrated computing device 10 and/or computer server 30 may employ the computationally implemented methods, systems, devices, and articles of manufacture in accordance with various embodiments. The computing device 10 and computer server 30, in various embodiments, may be endowed with logic that is designed to determine a level of authentication of a user of the computing device 10, and in response to such a determination, may automatically enable functions of the computing device 10.

First user 20 may be the primary user, such as the owner, of the computing device 10, or may be a person given authority to use the computing device by the owner. As discussed below, the level of authentication associated with the first user 20, whether owner or not, may be determined, at least partially based on a behavioral fingerprint 40 of the owner or other authorized user of computing device 10. More particularly, a level of authentication associated with first user 20 of computing device 10 can be determined based at least partially on a behavioral fingerprint 40 of the owner or other authorized user of computing device 10. The behavioral fingerprint 40 of an owner or other authorized user of computing device 10 can be configured to be network accessible by computing device 10 via network 50 to server[s] 30. Server[s] 30 can be a cloud of connected network servers, can be a web server, can be a centralized or fixed processing device, any combination thereof, and so forth. A behavioral fingerprint 40 of an owner/authorized user of computing device 10 can be configured to override or to at least be a contributing or impacting factor for a level of authentication associated with computing device 10. In certain example implementations, a behavioral fingerprint 40 may be stored at least partially at a computing device 10, may be stored at least partially at one or more servers 30, may be stored at least partially at one or more other devices 60, may be distributed across one or more devices 10/60 or servers 30, may be duplicated across one or more devices 10/60 or servers 30, any combination thereof, and so forth. If a behavioral fingerprint 40 is located distant from a device or server intending to access it, remote access may be provided, at least a portion of a behavioral fingerprint 40 may be transferred or copied to a device or server intending to access it, any combination thereof, and so forth.

Although the computing device 10 illustrated in FIG. 1 is depicted as being a tablet computer, in alternative embodiments, the computationally implemented methods, systems, devices, and articles of manufacture in accordance with various embodiments may be embodied in other types of computer systems having other form factors including other types of portable computing devices such as, for example, mobile telephones, laptops, Netbooks, mobile devices, smartphones, e-readers, portable game machines, entertainment appliances, a combination thereof, and so forth. For example, device[s] 60 illustrate smartphones, client computers and the like as possible computing devices. As illustrated, the computing device 10 can include a display 12, such as a touchscreen, on the front side 17a of the computing device 10. Computing device 10 can further include a keyboard or keypad, as a touch input/output keyboard, as an attached keyboard, as a physical keyboard, as a touch-screen virtual keyboard, any combination thereof, and so forth. As further depicted in FIG. 1, the display 12 displays an exemplary document 14 and a tool bar or menu 15. As further depicted, the computing device 10 may also include a camera 16 (e.g., a webcam) disposed on the front side 17a of the computing device 10. In some embodiments, additional cameras, screens, touch sensitive surfaces, other input and/or output implements, combinations thereof, etc. may be included on the front side 17a and/or backside of the computing device 10.

The first user 20 can be an authorized user of computing device 10 or a person who has no connection to the computing device 10. In an embodiment, a level of authentication and/or a behavioral fingerprint 40 can be at least partially determinative of the accessibility of computing device 10. In an example embodiment, computing device 10 may determine a level of authentication of first user 20 of a computing device 10. In an example embodiment, computing device 10 may use a level of authentication to enable or disable automatic functions of the computing device 10. For example, computing device 10 can be configured to automatically open doors to a home, car, or safe, or automatically permit operation of another authorized user-designated item, depending on the level of authentication associated with the computing device at that time.

In accordance with an example embodiment, a level of authentication determination may rely at least in part on a behavioral fingerprint 40 of one or more authorized users of computing device 10. A behavioral fingerprint 40 can be determined based on statistical calculations on social network collected data, sensor-provided data, user input, a combination of such data, and so forth. Thus, a level of authentication can be affected by a behavioral fingerprint 40 of an authorized user of computing device 10, which behavioral fingerprint 40 may include social network collected data, including data derived therefrom. The level of authentication can also be affected by various aspects at a time computing device 10 is turned on, such as aspects surrounding computing device 10 and/or aspects of the computing device itself (e.g., physical location, movements, detected images, combinations thereof, etc.). For example, when a computing device 10 of FIG. 1 is turned on by a first user 20, the first user 20 may input a password or pattern or other identifying input (e.g., biometric information), such as a fingerprint analysis, facial recognition, or the like. A level of authentication may recognize a user as an authorized user and then determine if a behavioral fingerprint 40 is established for that authorized user. A behavioral fingerprint 40 of an authorized user can be configured to work together to determine accessibility of computing device 10 to first user 20. A level of authentication and a behavioral fingerprint 40 can be directly correlated, or they can be configured to enable a level of authentication to override a behavioral fingerprint 40, or vice versa.

For example, a manufacturer of computing device 10 may be able to override a behavioral fingerprint of an authorized user of computing device 10 via a level of authentication by entering a secret code, such as a manufacturer's accessibility code or the like, in order to perform work on computing device 10. In one or more example embodiments, first user 20 can be a network-accessible user for which computing device 10 is just one of many network-accessible devices that network-accessible user 20 may use to access the internet, a cloud server, a mobile network, a combination thereof, and so forth. A network-accessible user can be an owner and/or operator of computing device 10 and/or other devices. For certain example embodiments, at least a portion of at least one behavioral fingerprint 40 that is associated with at least one user (e.g., a device owner, an authorized user, a first user 20, a combination thereof, etc.) may be located at (e.g., stored at) computing device 10, one or more devices 60, one or more servers 30, any combination thereof, and so forth. According to an example embodiment, a network-accessible user 20 can have a behavioral fingerprint 40 that exists outside of computing device 10, e.g., that can exist in a cloud computing system for which servers 30 are connected or form at least a part. According to another example embodiment, at least a portion of a behavioral fingerprint 40 may be transferred from one device 10/60 to another, from a device 10/60 to a server 30, from a server 30 to one or more devices 10/60, any combination thereof, and so forth. Devices 60 can further have a presence in the cloud computing system to facilitate the embodiments described herein. For example, each of devices 60 can be a network-accessible device to which a network-accessible user 20 may be connected. Thus, a network-accessible user 20 may be a user of one or several devices simultaneously and/or at different times. A network-accessible user 20 may also be a user of a public computing device, for example, if none of devices 60 are currently available to network-accessible user 20.

Figure 2A:
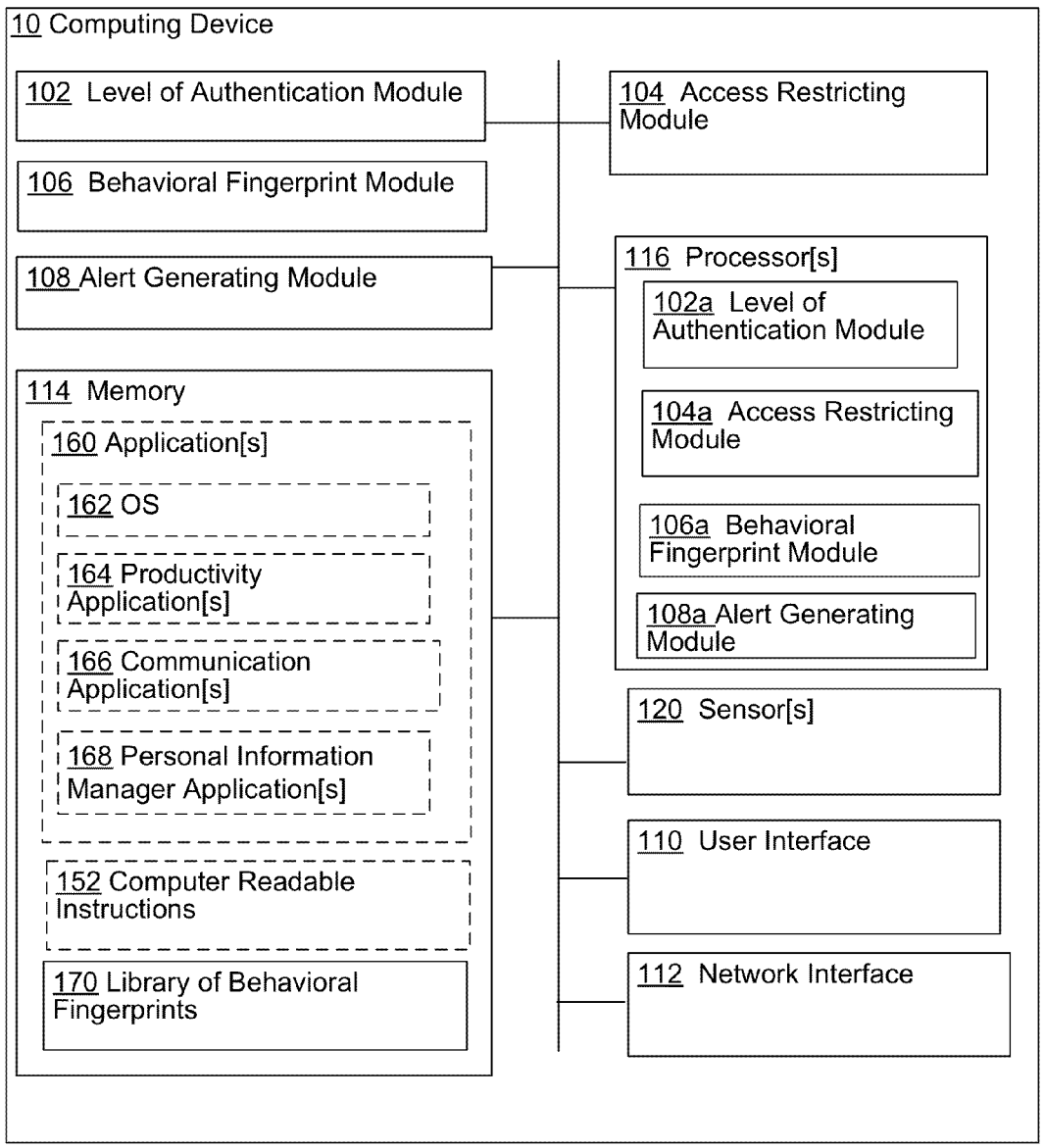
FIG. 2a shows a particular implementation of a computing device 10 of FIG. 1, in accordance with certain example embodiments.

Referring now to FIG. 2a, an example of a computing device 10 of FIG. 1 illustrates a level of authentication module 102, an access restricting module 104, a behavioral fingerprint module 106, an alert generating module 108, a memory 114 (which may store one or more applications 160 and/or a library of behavioral fingerprints 170), one or more processors 116 (e.g., microprocessors, controllers, etc.), one or more sensors 120, a user interface 110 (e.g., a display monitor that may include a touchscreen, a keypad, a mouse, a microphone, a speaker, a movement detector, etc.), a network interface 112 (e.g., network interface card or NIC), and so forth.

In various example embodiments, a level of authentication module 102 of FIG. 2a may comprise at least one logic module that is designed to determine a level of authentication associated with a first user 20 of a computing device 10. An access restricting module 104 may comprise at least one logic module that is designed to restrict access to one or more items in response to a determination made by the level of authentication module 102. An alert generating module 108 may comprise at least one logic module that is designed to generate an alert that causes the computing device 10 to communicate a variance to the level of authentication module to restrict capabilities of the computing device or access to the one or more items. The computing device 10 of FIGS. 1 and 2a, can include any one or more of e.g. four logic modules (e.g., the level of authentication module 102, the access restricting module 104, the behavioral fingerprint module 106, or the alert generating module 108) using circuitry including one or more components such as at least one application specific integrated circuit (ASIC). Alternatively, logic modules including a level of authentication module 102a, an access restricting module 104a, a behavioral fingerprint module 106a, or an alert generating module 108a can provide the same or similar functionality as and correspond to level of authentication module 102, access restricting module 104, behavioral fingerprint module 106, or alert generating module 108, respectively. Logic modules such as level of authentication module 102a, behavioral fingerprint module 106a, access restricting module 104a, or alert generating module 108a of the computing device 10 of FIG. 2a can be implemented by the one or more processors 116 by e.g. executing computer readable instructions 152 (e.g., software and/or firmware) that may be stored in the memory 114. Instructions may comprise, by way of example but not limitation, a program, a module, an application or app (e.g., that is native, that runs in a browser, that runs within a virtual machine, a combination thereof, etc.), an operating system, etc. or portion thereof; operational data structures; processor-executable instructions; code; or any combination thereof; and so forth. At least one medium (e.g., memory 114) may comprise, by way of example but not limitation, processor-accessible or non-transitory media that is or are capable of bearing instructions, data, files, configuration settings, a combination thereof, and so forth.

Note that although FIG. 2a illustrates certain logic modules (e.g., the level of authentication module 102, the access restricting module 104, the behavioral fingerprint module 106, and the alert generating module 108) being implemented using circuitry components such as at least one ASIC, logic modules 102, 102a, 104, 104a, 106, 106a, 108, or 108a may be implemented using a combination of specifically-designed circuitry such as at least one ASIC and one or more processors 116 (or other types of circuitry such as e.g. field programmable gate arrays (FPGAs)) executing computer readable instructions 152. For example, in some embodiments, at least one of the logic modules may be implemented using specially-designed circuitry (e.g., at least one ASIC) while a second logic module may be implemented using a processor 116 (or other types of programmable circuitry such as an FPGA) executing computer readable instructions 152 (e.g., software and/or firmware). A combination of software or firmware and circuitry may be implemented to realize certain ones of the example embodiments described herein; for example, one or more logic modules may be designed to use an efficient combination of software/hardware/firmware in order to expeditiously implement methods or systems within the scope of the present disclosure. For certain example embodiments, logic may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings. Circuitry may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings, wherein circuitry comprises at least one physical or hardware component or aspect.

In various example embodiments, memory 114 of the computing device 10 of FIG. 2a may comprise one or more of a mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), hierarchical memory, other types of memory devices, any combination thereof, and so forth. In various example embodiments, the one or more applications 160 stored in memory 114 may include, by way of example but not limitation, an operating system 162, one or more productivity applications 164 such as a word processing application or a spreadsheet application, one or more communication applications 166 such as an email or IM application, one or more personal information manager applications 168 (e.g., Microsoft® Outlook™), one or more social network applications such as Twitter™ and Facebook™, any combination thereof, and so forth.

Turning now to FIG. 2b, a particular example implementation of the level of authentication module 102 and 102a of FIG. 2a is shown. As illustrated, the level of authentication module 102 or 102a may include one or more sub-logic modules in various alternative example implementations. For example, in various implementations, the level of authentication module 102/102a may include a behavioral fingerprint interaction module 210, which may further include an anomalous action detecting module 212 or a social network confirmation module 216. Level of authentication module 102/102a may further include a statistical level determination module 218; a visual cue detecting module 220, which may include a face detecting module 222; an audio cue detecting module 226, which may include a voice pattern detecting module 227; a combination thereof; and so forth. Level of authentication module 102/102a may also include a geographic location determination or GPS module 230.

A behavioral fingerprint catalogue or a library of anomalous actions may be stored, for example, as part of behavioral fingerprint library 170 that is stored in memory 114 (see FIG. 2a) of the computing device 10 of FIG. 1. Therefore, if anomalous actions that match with a behavioral fingerprint catalogue or a library of anomalous changes (e.g., as stored in library 170 of the memory 114) have been detected, then at least an inference may be made that the user of computing device 10 is not authenticated or authorized, that a first user 20 is not an owner or an authorized user of computing device 10, that a first user is attempting to perform some action (e.g., access an application or functionality, access data, make a purchase, a combination thereof, etc.) that is not authorized or that is restricted, any combination thereof, and so forth.

In certain example embodiments, the computing device 10 may include logic that is designed to determine data from one or a combination of sensors 120 (e.g., of FIGS. 1 and 2d) that may be processed and analyzed. In example embodiments, computing device 10 may determine via one or more image capturing devices 204 (e.g., a webcam or digital camera), one or more audio capturing devices 206 (e.g., microphones), or images received by a computing device via one or more networked devices or social networks if the computing device 10 is no longer under the control of first user 20, which may cause a level of authentication determined in level of authentication module 102 to alter. For example, the computing device 10 in some cases may employ one or more movement sensors 202 to detect the actual movements of the computing device 10 or one or more image capturing devices 204 (which may use a facial recognition system/application) to determine that a face associated with the first user 20 is not a face associated with an owner or other authorized user(s) of computing device 10. Based on data provided by the movement sensors 202 or the image capturing devices 204, at least an inference may be made that the computing device 10 should have an alteration to the level of authentication.

Alternatively or additionally, in certain example embodiments, the computing device 10 may be endowed with a facial recognition system (e.g., facial recognition software) that when employed with one or more image capturing devices 204 may be used to determine the presence or absence of a face associated with an owner or other authorized user(s) of computing device 10 via a comparison to that of the first user 20. If a face associated with an authorized user of computing device 10 does not match first user 20, then a determination may be made to alter the level of authentication associated with first user 20. In addition to face recognition, other logic can include using the field of view of image capturing device 16 or one or more audio capturing devices or other sensor device(s) of the computing device 10 to identify an authorized user of the computing device through other recognition processes, such as fingerprint, retina, voice verification, global positioning system (GPS) location (e.g., in comparison to a known or expected location of an authorized user of computing device 10) other personal identification attributes or factors, any combination thereof and so forth.

In various example embodiments, one or more items that access may be restricted to (e.g., limit a user to using, exclude a user from using, limit a user to using a portion of but not all features of, exclude a user from using a portion of but not all features of, a combination thereof, etc.) may include, by way of example but not limitation, one or more electronic items that may have been open or running prior to a level of authentication change of the computing device 10, electronic items that were accessible through the computing device 10 (e.g., electronic documents and files that were stored in the computing device 10, electronic documents that were stored remotely but retrievable/viewable on computing device 10, a combination thereof, etc.) prior to an alteration of the level of authentication of the computing device 10, any combination thereof, and so forth.

In certain example embodiments, statistical level determination module 218 may be configured to apply statistical algorithms, comparative analysis, statistical probability functions, combinations thereof, etc. to determine a statistical level of authentication for computing device 10. In one embodiment, statistical level determination module 218 may apply a weighting function, which determines a level of authentication based on received data from scanners or other devices and a behavioral fingerprint, with each received data having a predetermined weight regarding relevance to authentication. Statistical level determination module 218 may additionally or alternatively analyze anomalous actions to determine or infer a level of authentication. To further determine or at least infer that the computing device 10 should have a low level of authentication, statistical examination/analysis of a detected anomalous action of the computing device 10 may involve comparing detected anomalies of the computing device 10 with catalogued anomalous actions or a library of anomalous actions (which may be stored in the memory 114 of the computing device 10 or at a remote location) that are identified as being actions associated with, for example, a transfer of computing device 10, a dropping of computing device 10, an action incompatible with the stored predicted future actions of an authorized user, an alert received from a social network that an expected or previously possessory authorized user does not have possession of computing device 10, any combination thereof, and so forth.

For certain example embodiments, computing device 10 may maintain in its memory 114 (see FIG. 2A) a behavioral fingerprint library 170 that may include a catalogue or library of: actions, inputs, movements, received network data (e.g., including anomalous data that have been previously-identified as anomalous that may be received if, for example, a computing device 10 is stolen or used by another user), a social network query fails to return appropriate confirmatory data that confirms that an authorized user is in control of computing device 10, any combination thereof, and so forth. Thus, if anomalous movements, inputs, actions, etc. that have been detected match something in a library of anomalous observations (e.g., indicating movements, inputs, actions, etc.), a determination or inference may be made that a level of authentication should be altered. The level of authentication can be lowered, for example, such that first user 20 is determined to have a lowest level of authentication.

In certain example embodiments, behavioral fingerprint interaction module 210 may receive data from behavior fingerprint module 106/106a or behavioral fingerprint library 170. Behavioral fingerprint interaction module 210 can apply data relating to one or more behavioral fingerprints of authorized users to determine a level of authentication. More particularly, level of authentication module 102/102a may be configured to receive a behavioral fingerprint as a list, set, matrix, etc. of activities, warnings, anomalous actions, any combination thereof, and so forth. Additional example details related to the level of authentication module 102/102a as well as the above-described sub-modules of the level of authentication module 102 will be provided below with respect to the operations and processes to be described herein.

Figure 2C:
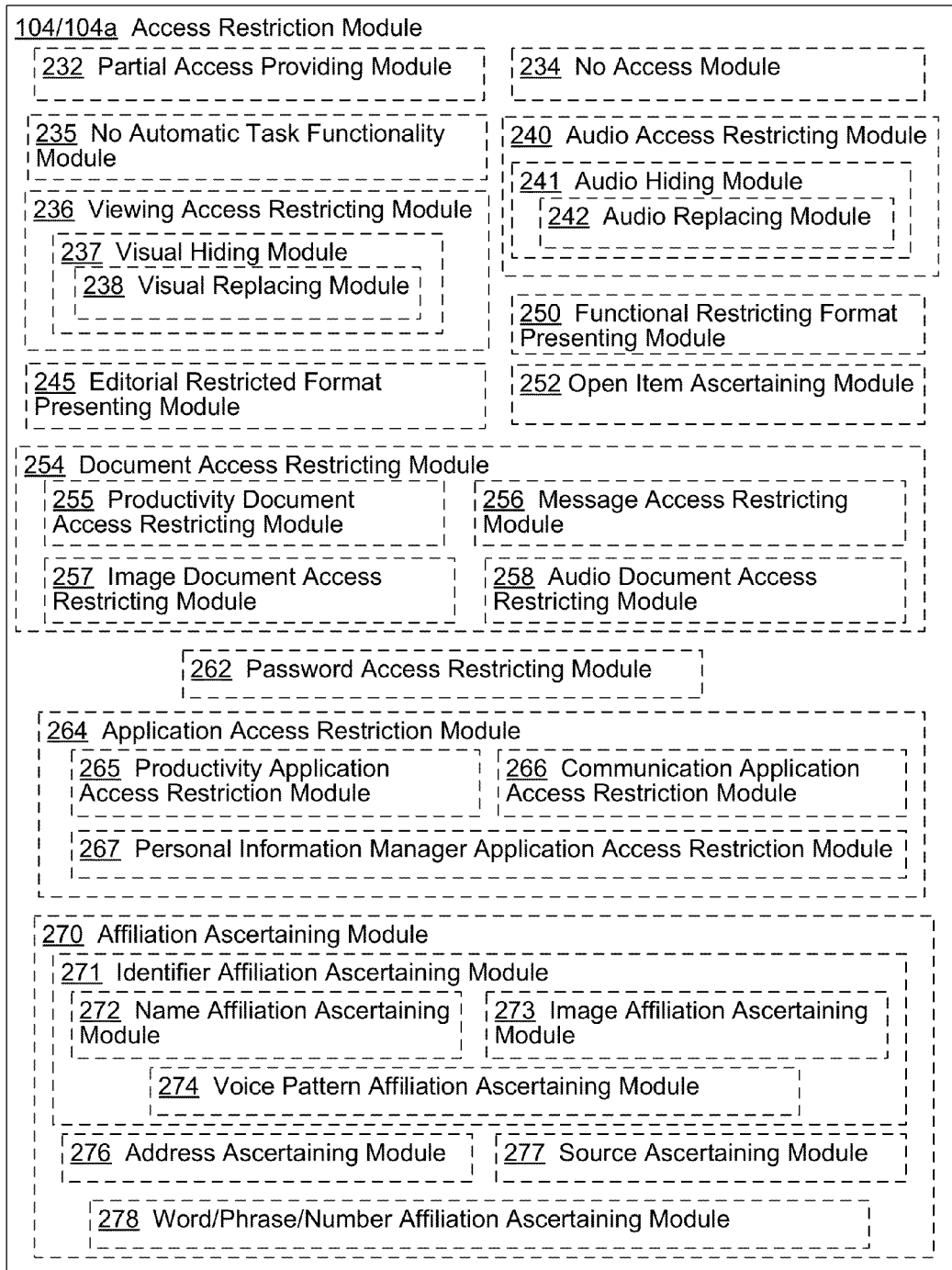
FIG. 2c shows another view of an access restriction module 104/104a, in accordance with certain example embodiments.

Referring now to FIG. 2c, a particular example implementation of an access restricting module 104/104a of FIG. 2a is illustrated. Access restricting module 104/104a of the computing device 10 of FIG. 2c can be configured to restrict access (e.g., hiding or disguising existence of features or data, denying viewing or editorial access to files or services, converting to read-only form, barring any access to a feature or service, combinations thereof, etc.) via the computing device 10 to one or more items (e.g., documents; image, audio, or video files; passwords; applications or portions/features thereof; services that cost money; designated content; any combination thereof; etc.) or preventing one or more actions by computing device 10.

As illustrated, the access restricting module 104/104a may include one or more sub-logic modules in various alternative example implementations. For example, in various implementations, the access restricting module 104/104a may include a partial access providing module 232, a no access module 234, a viewing access restricting module 236 (which may further include a visual hiding module 237 that may further include a visual replacing module 238), an audio access restricting module 240 (which may further include an audio hiding module 241 that may further include an audio replacing module 242), an editorial restricted format presenting module 245, a functional restricting format presenting module 250, an open item ascertaining module 252, a document access restricting module 254 (which may further include a productivity document access restricting module 255, a message access restricting module 256, an image document access restricting module 257, an audio document access restricting module 258, a combination thereof, etc.), a password access restricting module 262, any combination thereof, and so forth. As further illustrated in FIG. 2c, the access restricting module 104/104a, in various example implementations, may include an application access restriction module 264 (which may further include a productivity application access restriction module 265, a communication application access restriction module 266, a personal information manager application access restriction module 267, a combination thereof, etc.), an affiliation ascertaining module 270, any combination thereof, and so forth. As further illustrated in FIG. 2c, in various example implementations, the affiliation ascertaining module 270 may include one or more sub-modules including an identifier affiliation ascertaining module 271 (which may further include a name affiliation ascertaining module 272, an image affiliation ascertaining module 273, a voice pattern affiliation ascertaining module 274, a combination thereof, etc.), an address ascertaining module 276, a source ascertaining module 277, a word/phrase/number affiliation ascertaining module 278, any combination thereof, and so forth.

An example of how access restricting module 104/104a may operate includes determining if one or more productivity documents comprise word processing documents and restricting access to such items, which may involve hiding or disguising representations of the documents in a directory (e.g., omitting document names or subject headings in a directory or replacing the document names or subject headings in the directory with pseudo-names or subject headings). Alternatively, a non-editable form of the documents may be presented in order to restrict access to such documents. If, alternatively, one or more items comprise one or more software applications, restricting access to such items may involve denying use of one or more functionalities associated with the items (e.g., applications). For example, if the one or more items include a word processing application, restricting access to such a word processing application may include disabling one or more editing functions of the application while allowing general access to the word processing application (e.g., permitting viewing of files). For example, if the one or more items include a social networking or communication application, restricting access to such an application may include disabling one or more abilities to initiate outgoing communications (e.g., send an email, send a text or IM, post to a wall, send a tweet, a combination thereof, etc.) while allowing one or more abilities to view or otherwise experience incoming communications (e.g., read a received email, hear a received voice mail, read a text or IM, read wall postings, read a Twitter™ feed, a combination thereof, etc.).

Figure 2D:
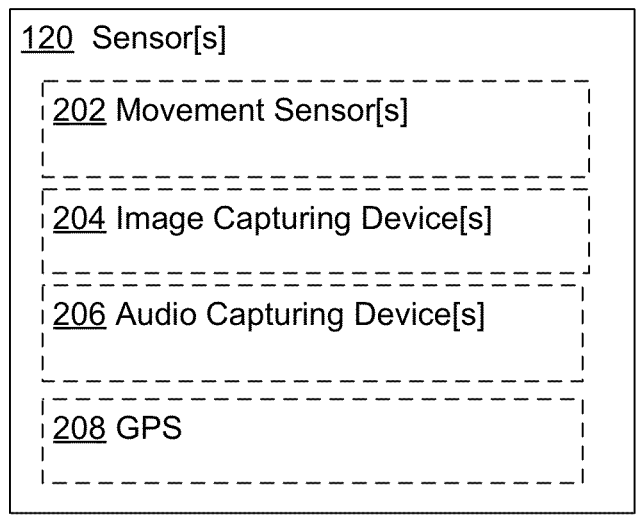
FIG. 2d shows various types of sensors 120 that may be included in a computing device 10, in accordance with certain example embodiments.

FIG. 2d illustrates examples of various types of sensors 120 that may be included with the computing device 10 of FIG. 1. As illustrated, sensors 120 that may be included with the computing device 10 may include one or more movement sensors 202 (e.g., an inertial measurement unit (IMU), a compass, a gyroscope, an accelerometer, a combination thereof, etc.), one or more image capturing devices 204 (e.g., a web cam, a digital camera, a photo-sensitive integrated circuit, a combination thereof, etc.), one or more audio capturing devices 206 (e.g., a microphone), a global positioning system (GPS) 208, any combination thereof, and so forth. Sensors may further include, by way of example but not limitation, other apparatuses that can be used to determine actual or relative geographic location, such as those that determine geographic location using triangulation, trilateration, etc. techniques applied to signals transmitted by satellites, by communication towers such as cellular towers, by WiFi access points, a combination thereof, and so forth.

One example way to monitor actions taken by first user 20 with respect to computing device 10 is to directly detect such actions using one or more sensors, such as any of those shown in FIG. 2d, that are designed to directly detect/measure activities by first user 20 of computing device 10. Sensors can be integrated with computing device 10 and may be used to detect an action taken with respect to the computing device 10 as the computing device 10 is being used by first user 20. For example, a fingerprint detection sensor or a facial recognition sensor can provide fingerprint data or facial data that may be used to determine whether first user 20 is an authorized user of computing device 10. Once first user 20 is determined to be or is otherwise associated with an authorized user of computing device 10, a behavioral fingerprint associated with the associated authorized user can be accessed. The behavioral fingerprint module 106/106a can process data received by behavioral fingerprint library 170 and provide behavioral fingerprint data to level of authentication module 102/102a. In an example embodiment, level of authentication module 102/102a may receive behavioral fingerprint data from behavioral fingerprint library 170 and determine an accessibility aspect of computing device 10 based at least in part on the determined behavioral fingerprint.

Figure 2E:
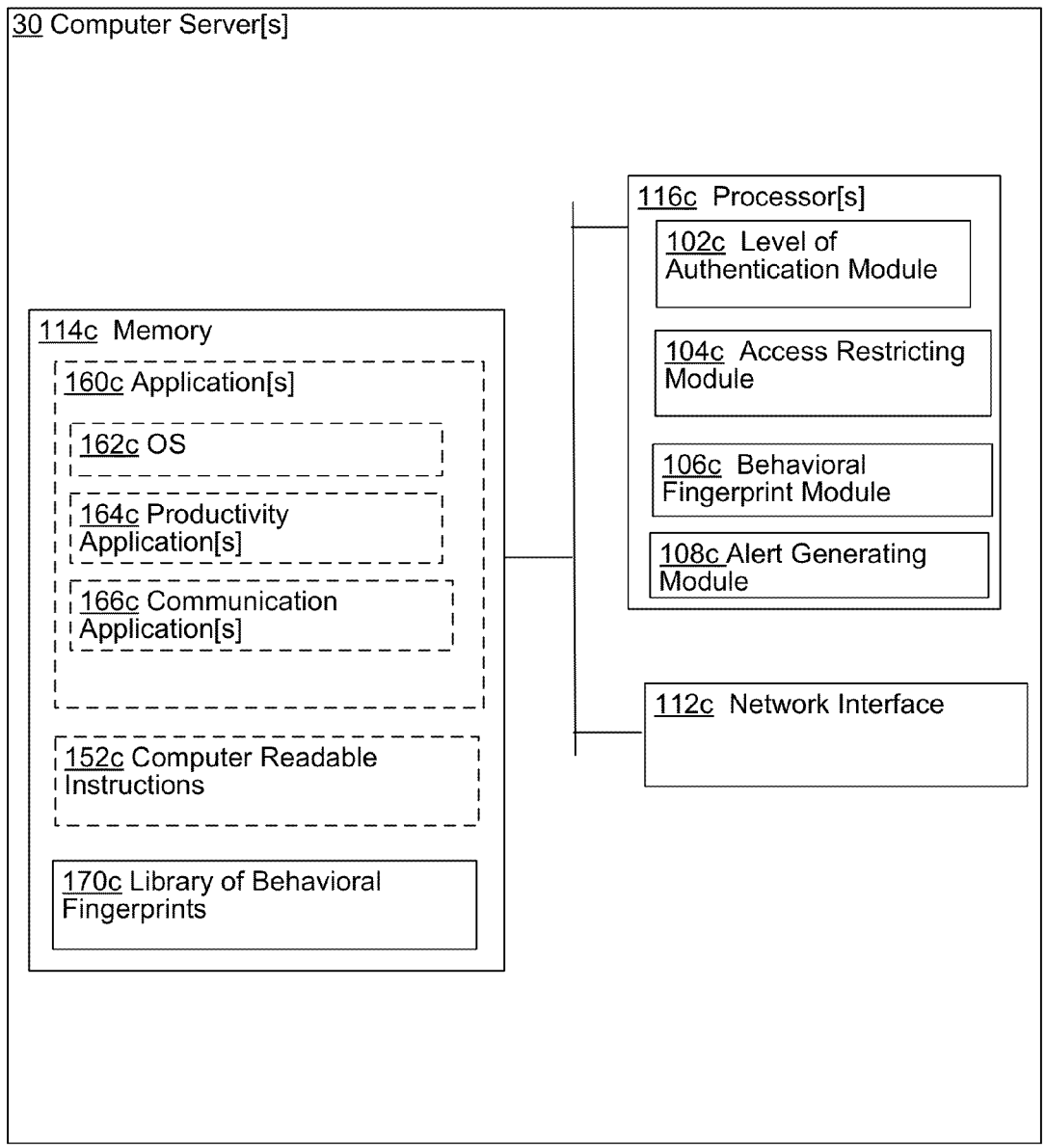
FIG. 2e shows a particular implementation of a computer server 30 of FIG. 1, in accordance with certain example embodiments.

For certain example embodiments, referring now to FIG. 2e, a computer server 30 of FIG. 1 may include at least a portion of functionality that is similar, analogous, comparable, etc. to that of computing device 10. As such, FIG. 2e illustrates a level of authentication module 102c, an access restricting module 104c, a behavioral fingerprint module 106c, an alert generating module 108c, a memory 114c (which may store one or more applications 160c, one or more computer readable instructions 152c, or a library of behavioral fingerprints 170c), one or more processors 116c (e.g., microprocessors, controllers, etc.), or a network interface 112c (e.g., network interface card or NIC). Although not explicitly referenced above, descriptions of level of authentication module 102/102a, access restricting module 104/104a, behavioral fingerprint module 106/106a, and alert generating module 108/108a may respectively apply to level of authentication module 102c, access restricting module 104c, behavioral fingerprint module 106c, and alert generating module 108c, unless context dictates otherwise.

In various example embodiments, logic modules level of authentication module 102c, behavioral fingerprint module 106c, access restricting module 104c, or alert generating module 108c of the computer server 30 of FIG. 2e can be implemented by the one or more processors 116c executing computer readable instructions 152c (e.g., software and/or firmware) that may be stored in memory 114.

Note that although FIG. 2e illustrates logic modules (e.g., level of authentication module 102c, access restricting module 104c, behavioral fingerprint module 106c, or alert generating module 108c) being implemented at least partially using processor-based modules, circuitry-based components (e.g., such as an ASIC) may be used to implement one or more of them. For instance, a combination of specifically-designed circuitry such as at least one ASIC (or other types of circuitry such as field programmable gate arrays or FPGAs) and one or more processors 116c executing computer readable instructions 152c may be used to implement one or more logic modules. For example, in some embodiments, at least one logic module may be implemented using specially-designed circuitry (e.g., an ASIC) and a second logic module may be implemented using a processor 116c (or other types of programmable circuitry such as an FPGA) executing computer readable instructions (e.g., software and/or firmware). A combination of software or firmware and circuitry may be implemented to realize certain ones of the example embodiments described herein; for example, one or more logic modules may be designed to use an efficient combination of software/hardware/firmware in order to expeditiously implement methods or systems within the scope of the present disclosure.

In various example embodiments, memory 114c of a computer server 30 of FIG. 2e may comprise one or more of: a mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), distributed memory, hierarchical memory, storage area network memory, other types of memory devices, any combination thereof, and so forth. In various example embodiments, one or more applications 160c stored in memory 114c may include, for example, an operating system 162c, one or more productivity applications 164c such as a word processing application or a spreadsheet application, one or more communication applications 166c, any combination thereof, and so forth.

Figure 3A:
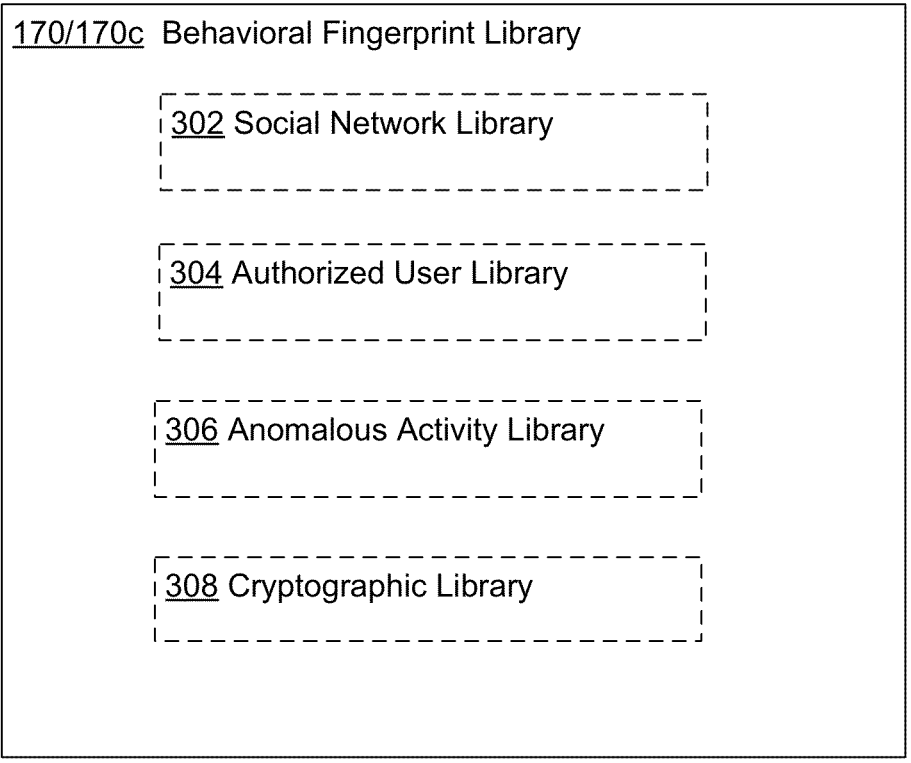
FIG. 3a shows another view of a behavioral fingerprint library 170, in accordance with certain example embodiments.

Referring now to FIG. 3a, an example behavioral fingerprint library 170/170c is shown with more particularity. Computing device 10 or computer server 30 may maintain in its memory 114/114c (see FIG. 2a and FIG. 2e) a behavioral fingerprint library 170/170c (see also FIG. 2a and FIG. 2e), which may comprise a catalog or library that identifies a plurality of actions by one or more users. Examples of user actions may include, but are not limited to, network interactions, such as social network interactions, which may include one or more alerts relating to one or more users that if detected as occurring may be considered to at least imply that computing device 10 is being used by an authorized user. FIG. 3a includes examples modules or functionalities that may be present at or performed by computing device 10 or computer server 30. In the case of computer server 30, the functionalities of the various example modules can be replicated for a plurality of computer devices or authorized users of one or more computer devices, as will be appreciated by one of ordinary skill in the art. For example, computer server 30 can be implemented as part of a computer farm, such as may exist in a cloud computing setting, and enable productivity applications 164c or communications applications 166c to be performed, provided, or otherwise realized via cloud computing technologies. As such, functional or modular replications may be included within the scope of the present application.

As shown in FIG. 3a, for certain example embodiments, a behavioral fingerprint library 170/170c may include at least one social network library 302, at least one authorized user library 304, at least one anomalous activity library 306, at least one cryptographic library 308, any combination thereof, and so forth. Example aspects of libraries that may form at least a part of a behavioral fingerprint library 170/170c are described below with reference to at least FIG. 3a.

For certain example embodiments, a social network library 302 can be configured to store interactions between authorized users and one or more other entities. For example, one or more social networks may include Facebook™, Twitter™, LinkedIn™, Pinterest™, Instagram™, Classmates™, combinations thereof, and so forth. Social network library 302 can be configured to store messages or other data relating to one or more social networks such that behavioral fingerprint module 106/106a/106c can determine if action should be taken based on the messages. For example, an authorized user of computing device 10 or another device via computer server 30 or over network 50 may post a message via a social network indicating that computing device 10 is no longer under his/her control. Computing device 10 may automatically receive such a post over a network connection or from computer server 30 via network interface 112/112c and provide it to social network library 302, which may create or prompt a lowered level of authentication for first user 20, possibly before first user 20 even attempts to use computing device 10. A higher level of authentication may be reestablished by an authorized user of computing device 10 after return of possession of the computing device 10 so that an authorized user may have full functionality of computing device 10 or so as to restore a prior (e.g., higher) level of authentication or the like.

In certain example implementations, a social network library 302 can identify any messages with aspects indicative of being relevant to authentication. A social network library 302 can be configured to identify key words, such as "stolen" or "lost", and to pass on a warning notification to behavioral fingerprint module 106/106a/106c or level of authentication module 102/102a/102c for further processing. In one embodiment, network library 302 may apply at least one search algorithm to identify key word(s) to assist in determining behaviors that are authentication positive or authentication negative. For example, "stolen" or "lost" may be deemed to be authentication negative key words. Conversely, a current message from a current "friend" on Facebook™ in conjunction with a response using computing device 10 may be deemed to be authentication positive. Moreover, indications that an authorized user of computing device 10 is interacting with previously verified or identified "friends" on Facebook™ (or, more generally, with previously verified or identified known members of a social network) may be deemed to be authentication positive.

For certain example embodiments, a behavioral fingerprint library 170/170c (e.g., of FIG. 3a) may include an authorized user library 304, which may include a library of authorized users of computing device 10. Computing device 10, computer server 30, one or more accounts on computer server 30, a combination thereof, etc. can be associated with one or more authorized users. Authorized users can include, by way of example but not limitation, an owner or several owners (e.g., co-owners) as well as users with varying degrees of permission for using computing device 10 or other computer devices. Authorized user library 304 can include profiles for each authorized user, including one or more passwords. Behavioral fingerprint module 106/106a/106c or level of authentication module 102/102a/102c can be individually or jointly associated with one or more authorized users, or associated with a single authorized user, in accordance with system settings or configuration preferences. For example, each authorized user can have a separate designated behavioral fingerprint or multiple authorized users may share at least one behavioral fingerprint. When first user 20 is identified as one of a plurality of authorized users, a behavioral fingerprint for that authorized user may be associated with first user 20, and a corresponding level of authentication can be determined.

For certain example embodiments, a behavioral fingerprint library 170/170c (e.g., of FIG. 3a) may include an anomalous activity library 306. Anomalous activity library 306 may include data indicating that an anomalous activity has taken place, data that represents activity that has been previously-identified as being deemed anomalous, any combination thereof, and so forth. In one embodiment, an authorized user can store or log activities that the user has predetermined to be anomalous. For example, an authorized user may provide a list of area codes for which the computing device, when operated as a phone, would consider anomalous. An area code list may include, for instance, all foreign country phone numbers, specific area codes, or the like that the authorized user would not normally call from computing device 10. An authorized user may further identify actions that would be deemed anomalous for that authorized user. Identified actions may include, by way of example but not limitation, device usage during designated times of day, positioning/carrying a device to locations (e.g., as determined by a GPS) that are indicated to be areas an authorized user considered anomalous, application-specific actions identified as anomalous, a combination thereof, and so forth. An example of application-specific actions may include deletion of significant amounts of data, logging into a social network as a user that is not an authorized user of computing device 10, combinations thereof, and so forth. In an example embodiment, an anomalous activity library 306 may log one or more activities that are received via a network and that are determined to be anomalous. For instance, a social-networked entity can post a message via a social network that is monitored by a computing device 10 or a computer server 30 that includes a warning or other indication of at least one unsafe condition associated with computing device 10. An anomalous activity library 306 may be configured to log a warning so that a behavioral fingerprint module 106/106a/106c can determine whether to associate the warning with an authorized user.

For certain example embodiments, a behavioral fingerprint library 170/170c (e.g., of FIG. 3a) may include a cryptographic library 308. A cryptographic library 208 may include, by way of example but not limitation, data such as passwords, public/private key pair data, other cryptographic keys such as the types used in block ciphers such as Triple DES or substitution permutation algorithms like AES, any combination thereof, and so forth. As will be appreciated by those of skill in the art, Triple DES data may be encrypted with a first key, decrypted with a second key, and then encrypted again with a third key, resulting in, e.g., 168 bit encryption. AES encryption can use variable key lengths. For example, keys used in AES can have lengths of, e.g., 128, 192, or 256 bits to encrypt blocks with a length of, e.g., 128 bits. As will be appreciated by those of skill in the art with the benefit of the present application, key lengths and cryptographic techniques can change over time as computing capabilities change and progress. As such, the key lengths and cryptographic techniques described herein are exemplary only and not intended to be limiting in any way.

For an example implementation, a cryptographic library 308 can receive data from one or more social networks or other designated sources to create or reconstruct/regenerate one or more cryptographic keys, such as to create or reconstruct an encryption key, a decryption key, or a key pair. For example, as part of an authorized user's behavioral fingerprint, the authorized user may assign parts of a cryptographic key (or one or more components derived therefrom), such as an asymmetric or a symmetric key, to one or more members (e.g., "friends") of a social network. In the current state of the art, an asymmetric key may include a "public key" (e.g., a public encryption key) that does not need to be kept secret or a "private key" (e.g., a private decryption key) that is generally kept secret, and a symmetric key may include a "secret key" that is typically protected by reducing, if not minimizing, its exposure.

For purposes of the present application, in example embodiments presented herein, the terms "asymmetric key," "symmetric key," "encryption key," "decryption key," "public key," "private key," etc. are intended to contemplate and/or encompass possible changes in cryptographic algorithms for which different types of cryptographic keys may be involved to provide protection. Furthermore, example embodiments herein contemplate the re-emergence and/or generation of cryptographic systems wherein cryptographic keys may be made public and the specific cryptographic algorithms used to generate or apply cryptographic keys may instead be kept secret. For example, in an attempt to thwart piracy, some computer gaming software systems now execute certain security code(s) on a remote server instead of the local device. In this case, the data may be known, but the code implementing the algorithm may be kept secret. The use of the terms cryptographic, asymmetric, symmetric, public, private, etc. should not be interpreted as being restricted to current forms of public/private key pair cryptography or to other current forms of cryptography, but rather to more general cases of establishing a means of secure communication with some aspect being kept secret. For example, key-based cryptography may be, e.g., symmetrical or asymmetrical, with some aspect being known and/or some aspect being unknown.

In certain example embodiments, if an anomalous event occurs which causes an authorized user's behavioral fingerprint to be compromised, an authorized user can reestablish a behavioral fingerprint by notifying each designated social network member to send a portion of a cryptographic key (or a component that is derived therefrom), so that if the key is reconstructed, the behavioral fingerprint may be rebuilt.

Figure 3B:
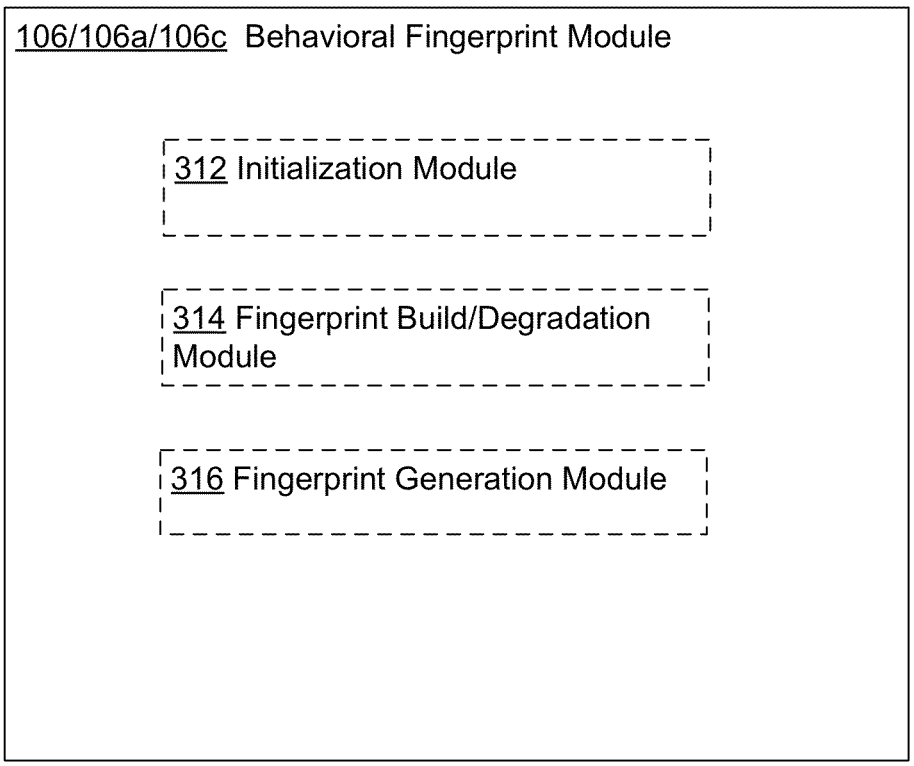
FIG. 3b shows another view of a behavioral fingerprint module 106/106a, in accordance with certain example embodiments.

For certain example embodiments, with reference to FIG. 3b, a behavioral fingerprint module 106/106a/106c is shown in more detail. Behavioral fingerprint module 106/106a/106c may receive data from behavioral fingerprint library 170 (e.g., of FIGS. 1, 2e, and 3a). Behavioral fingerprint module 106/106a/106c is shown, by way of example but not limitation, including at least one initialization module 312, at least one fingerprint build/degradation module 314, or at least one fingerprint generation module 316.

For certain example embodiments, an initialization module 312 may be configured to determine an initial behavioral fingerprint associated with an authorized user. An initial behavioral fingerprint may be based at least partially, for example, on data entered by an authorized user, data obtained from a behavioral fingerprint library 170/170c, data obtained from sensor(s) 120, data received from another location (e.g., a computing device 10 receiving behavioral fingerprint data from a server 30, a server 30 receiving behavioral fingerprint data from a computing device 10, etc.), any combination thereof, and so forth.

For certain example embodiments, a fingerprint build/degradation module 314 may be configured to determine if an initial behavioral fingerprint should be altered due to data obtained from a behavioral fingerprint library 170/170c, date obtained from sensor(s) 120, data received from another location, any combination thereof, and so forth.

For certain example embodiments, a fingerprint generation module 316 may be configured to determine a current behavioral fingerprint for a first user 20 that is determined to be an authorized user attempting to operate computing device 10. A fingerprint generation module 316 may be configured to determine a behavioral fingerprint for an established authorized user based on network data received while computing device 10 is coupled to a network connection. In a case in which a fingerprint generation module 316 exists in a cloud computing setting or on a computer server 30, a fingerprint generation module 316 may be configured to determine a network-based behavioral fingerprint for a plurality of users when logging into a network 50, a cloud computing system, a computer server 30, any combination thereof, and so forth.

For certain example embodiments, a behavioral fingerprint can be determined before a first user 20 handles a computing device 10. In some example embodiments, a manufacturer can set a behavioral fingerprint or a level of authentication based, e.g., at least partially on information received from a first user 20 when ordering a computing device 10. For example, a manufacture may preconfigure one or more user names, passwords, combinations thereof, etc. prior to shipping or selling a computing device 10. At least in an environment that includes at least one computer server 30, a behavioral fingerprint can be transferred from another device, such as one or more of devices 60, to a computing device 10. Whether a level of authentication or a behavioral fingerprint controls or otherwise affects the accessibility and actions available to a first user 20 may depend on system requirements, which may be adjustable. For example, a behavioral fingerprint may indicate that computing device 10 has been stolen, and, in such a case, a behavioral fingerprint library 170/170c may be configured to notify a level of authentication module 102/102a/102c of exigent circumstances indicating that a reduced access to computing device 10 is advisable. Thus, by way of example but not limitation, a computer server 30 may have access to a behavioral fingerprint library 170c or a computing device 10 may have access to a behavioral fingerprint library 170, and at least one of them may notify a level of authentication module 102, 102a, or 102c of exigent circumstances.

Additionally or alternatively, in example embodiments, a behavioral fingerprint module 106/106a/106c may be configured to reconstruct some type of cryptographic key (such as a private key of an asymmetric key pair or a Triple DES or AES type symmetric key) after an anomalous event. A behavioral fingerprint module 106/106a/106c may be configured to notify a level of authentication module 102/102a/102c that an authorized user should have a level of authentication that allows access.

In example embodiments, behavioral fingerprint module 106/106a/106c can receive data related to various types of movements, actions, inputs, combinations thereof, etc. that are related to a computing device 10. For example, an initial behavioral fingerprint generated by a behavioral fingerprint module 106/106a/106c may be configured to communicate to a level of authentication module 102/102a/102c one or more predetermined or determinable inputs to computing device 10 and/or computer server 30 to provide access.

Other examples of movements, actions, inputs, combinations thereof, etc. that may be tracked for purposes of determining a behavioral fingerprint may include, by way of example but not limitation, individually or in any combination, those detected or tracked using one or more sensors 120 that may be included with or accessible to a computing device 10 as illustrated in FIG. 2d. In various example embodiments, one or more movement sensors 202, GPS/geographical location sensors 208, a combination thereof, etc. may directly detect movements, or one or more of other types of sensors (e.g., image capturing devices 204, audio capturing devices 206, a combination thereof, etc.) may be able to indirectly detect movements (e.g., as sensed images, sound, a combination thereof, etc. change). One or more additional or predetermined actions may be employed to confirm other actions taken with respect to a computing device 10 as will be further described herein. Other type(s) of sensor may relate to how a person uses an input device, such as a physical or virtual keyboard or keypad or a touch screen or a voice input. For example, such sensor(s) may determine a particular way in which a first user 20 types (e.g., in terms of timing between presses, duration of presses, locations of finger contacts, combinations thereof, etc.) on a keyboard of a computing device 10 or uses pressure on keys, a touch-sensitive screen, or another input apparatus of a computing device 10. For example, a first user may repetitively use particular keys with a particular pressure or the like. At least one key usage pattern may be employed in a behavioral fingerprint module 106/106a/106c to build on a behavioral fingerprint with a fingerprint build/degradation module 314, for example.

For certain example embodiments, a type or types of access to be restricted in response to determining that a computing device 10 or a computer server 30 has altered a level of authentication for first user 20 may depend on one or more factors, including e.g. what types of actions are requested. For example, if the one or more items to which access is being at least partially restricted comprise one or more software applications (herein "applications"), then a type of access restriction may include restriction to (e.g., limit a user to using, exclude a user from using, limit a user to using a portion of but not all features of, exclude a user from using a portion of but not all features of, a combination thereof, etc.) one or more functionalities of the one or more applications. Additionally or alternatively, access restriction or disabling of one or more applications may entail having access to the one or more applications being, for instance, completely blocked or hidden. In contrast, if the one or more items to which access is being at least partially restricted comprise one or more electronic documents (e.g., productivity documents; image, audio, or video files; a combination thereof; etc.), then a type of access restriction that may be applied to such items may relate to one or more editorial access restrictions (e.g., restrictions against modification, deletion, addition, a combination thereof, etc.) of the items as a function of the level of authentication. Additionally or alternatively, automatic actions or tasks may be restricted or disabled as a function of a lowered level of authentication, or automatic actions or tasks may be enhanced or enabled as a function of a raised level of authentication.

In certain example implementations, restricting access to one or more items may include restricting viewing access to the one or more items, or in other cases it may include restricting audio access to the one or more items. In example implementations, restricting access to one or more items or one or more actions may include a complete restriction to access of the one or more items or the one or more actions, or restricting access to one or more items or one or more actions may include a partial restriction to access of the one or more items or the one or more actions. A more detailed description related to various example types of access restrictions that may be applied to one or more items or one or more actions is provided below with respect to operations and processes described herein.

In certain example embodiments, a computing device 10, in response to restricting access to one or more items or preventing one or more automatic actions, may be configured to generate an alert that indicates that the computing device 10 has been adjusted to restrict access to the one or more items or disable the one or more automatic actions. In certain example implementations, an alert can be transmitted from, received at, exchanged between, a combination thereof, etc. computer server 30 or computing device 10, depending on a source of the alert and an exigency of the alert.

Figure 4:
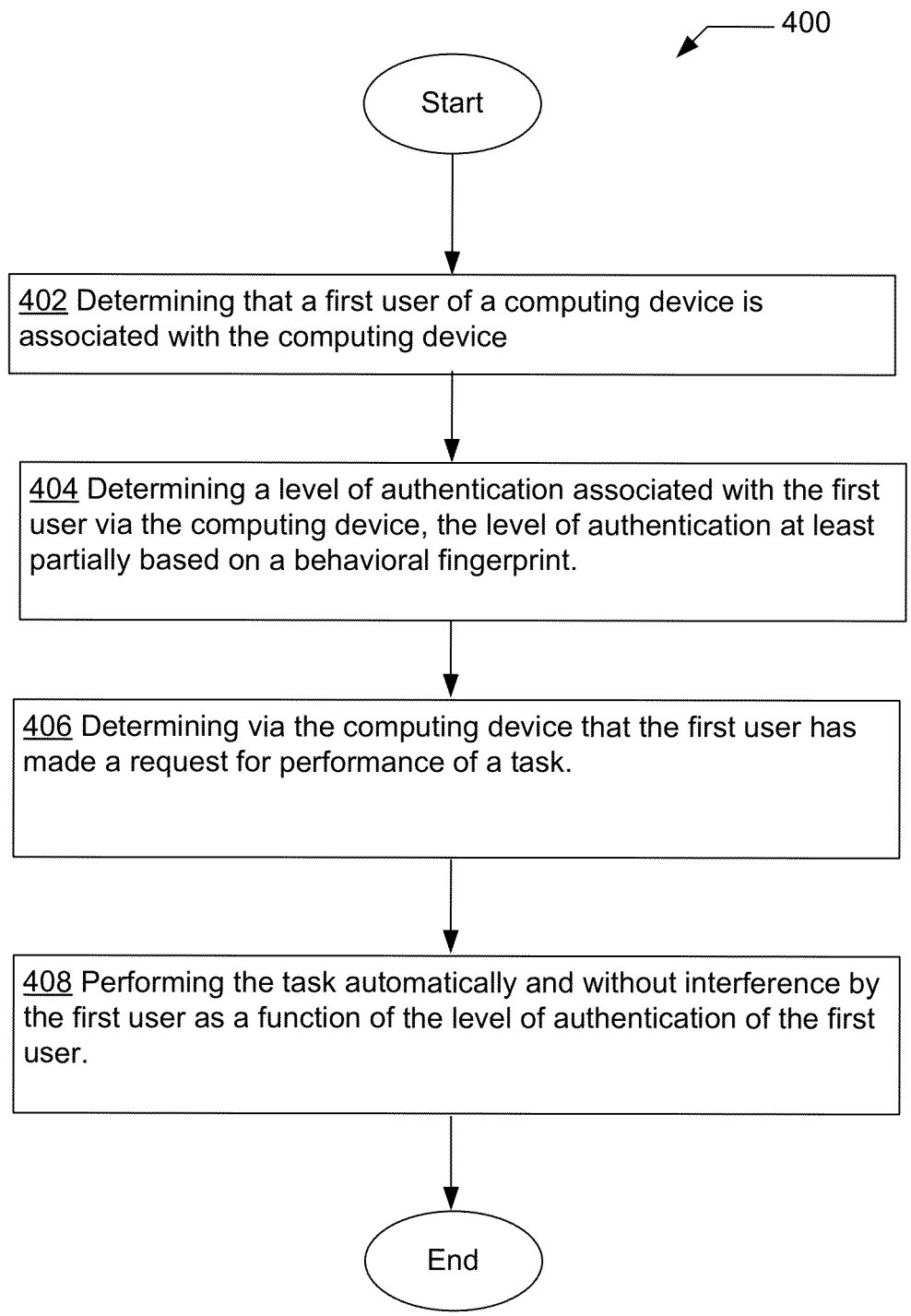
FIG. 4 is a high-level logic flowchart of a process depicting an implementation of a computing device, in accordance with certain example embodiments.

A more detailed discussion related to examples of a computing device 10 of FIGS. 1-3 is provided with respect to the processes and operations described herein below. FIG. 4 illustrates an example operational flow 400 representing example operations for, among other things, restricting access via a computing device to one or more items (e.g., software applications, electronic documents including productivity documents, audio/video or image files, electronic messages including emails, passwords, combinations thereof, etc.). In FIG. 4 and in the following figures that include various examples of operational flows, discussions and explanations are provided with respect to an exemplary environment 100 described above and as illustrated in FIG. 1 or with respect to other examples (e.g., as provided in FIGS. 2 and 3) or contexts. However, it should be understood that the operational flows may be executed in a number of other environments and contexts, or in modified versions of FIG. 2a, 2b, 2c, or 2d or FIG. 3a or 3b. Also, although various operational flows are presented in particular sequence(s) as illustrated, it should be understood that example operations may be performed in other orders that differ from those which are illustrated, or may be performed fully or partially concurrently.

Further, in FIG. 4 and in figures that follow thereafter, various example operations may be depicted in a box-within-a-box manner. Such depictions may indicate that an operation illustrated in an internal box may comprise an optional example embodiment of the operation(s) illustrated in one or more external boxes. However, it should be understood that internal box operations may be viewed as independent operations separate from any associated external boxes and may be performed in any sequence with respect to other illustrated operations, or may be performed fully or partially concurrently. Still further, those operations illustrated in FIG. 4 as well as other operations described herein may be performed by at least one of a machine, an article of manufacture, a composition of matter, or a combination thereof, etc., unless indicated otherwise.

For certain example embodiments, after a start operation, operational flow 400 of FIG. 4 may move to an example association operation 402 for determining that a first user of a computing device is associated with the computing device. For instance, and as an non-limiting illustration, a level of authentication module 102/102a of a computing device 10 of FIG. 1 may determine that a computing device 10 used by a first user 20 (e.g., an unknown user having relatively inferior access rights or an authorized user of a computing device 10 having relatively superior access rights) has turned on, logged onto (e.g., entered a user identification and password into), starting "using", a combination thereof, etc. computing device 10. Note that in certain example implementations, a first user 20 may "use" the computing device 10 by logging onto the computing device 10 or by employing the computing device 10 to access one or more applications or content that may be accessible through the computing device 10. In addition to the association operation 402, operational flow 400 may also include a level of authentication operation 404 for determining a level of authentication associated with the first user via the computing device, the level of authentication at least partially based on a behavioral fingerprint as further illustrated in FIG. 4. For instance, and as a non-limiting illustration, level of authentication module 102/102a may determine a level of authentication for first user 20. A level of authentication can be configured to restrict access to (e.g., limit a user to using, exclude a user from using, limit a user to using a portion of but not all features of, exclude a user from using a portion of but not all features of, a combination thereof, etc.) one or more items or actions related to a computing device 10 as a function of the level of authentication assigned to first user 20. If first user 20 is identified as an authorized user, level of authentication module 102/102a can be configured to take into account a behavioral fingerprint associated with that authorized user. By way of example only, a computing device 10 that identifies a first user 20 as an authorized user may incorporate actions of the first user 20 with the computing device 10 into a behavioral fingerprint that is generated, built, degraded, or modified (e.g., at least partially by behavioral fingerprint module 106/106a). As another example, a computing device 10 may identify a first user 20 as being an authorized user or as not being an authorized user (or as being an authorized user with partial access rights, etc.) by comparing current sensed action(s) of the first user 20 to an existing behavioral fingerprint (e.g., at least partially by a level of authentication module 102/102a) using, for instance, a statistical mechanism that reflects a probabilistic likelihood that one or more current actions by a first user 20 are being performed or otherwise effectuated by a user (e.g., an authorized user) that is associated with an existing behavioral fingerprint.

In addition to level of authentication operation 404, operational flow 400 as illustrated includes operation 406 for determining via the computing device that the first user has made a request for performance of a task. For instance, as a non-limiting illustration, a user interface 110 of a computing device 10 may receive an input from first user 20 to access an application 160, to access a document or file, to pay for something using computing device 10, to open a device using computing device 10, to perform an action within an application (e.g., change a file, make an outgoing communication, read a new incoming communication, may a purchase, a combination thereof, etc.), to install an application, to make a phone call, any combination thereof, and so forth. Operation 406 as illustrated may be followed by operation 408 for performing the task automatically without interference by the first user as a function of the level of authentication of the first user. For instance, as a non-limiting illustration, a level of authentication module 102/102a of a computing device 10 of (e.g., of FIG. 1) may determine automatically without interference by a first user 20 (e.g., without prompting of first user 20; without requiring first user 20 to enter authentication-related information, such as a password, a manual input pattern, a biometric input pattern, combinations thereof, etc.; without asking first user 20 for additional input, such as confirmation; a combination thereof; etc.) that first user 20 is an authorized user and may perform a requested task (e.g., may activate one of applications 160, may access stored or streamable/downloadable content, may permit a purchase, may make an outgoing combination, may install an application, a combination thereof, etc.) automatically based at least partially on a level of authentication associated with or assigned to the first user 20.

Figure 5A:
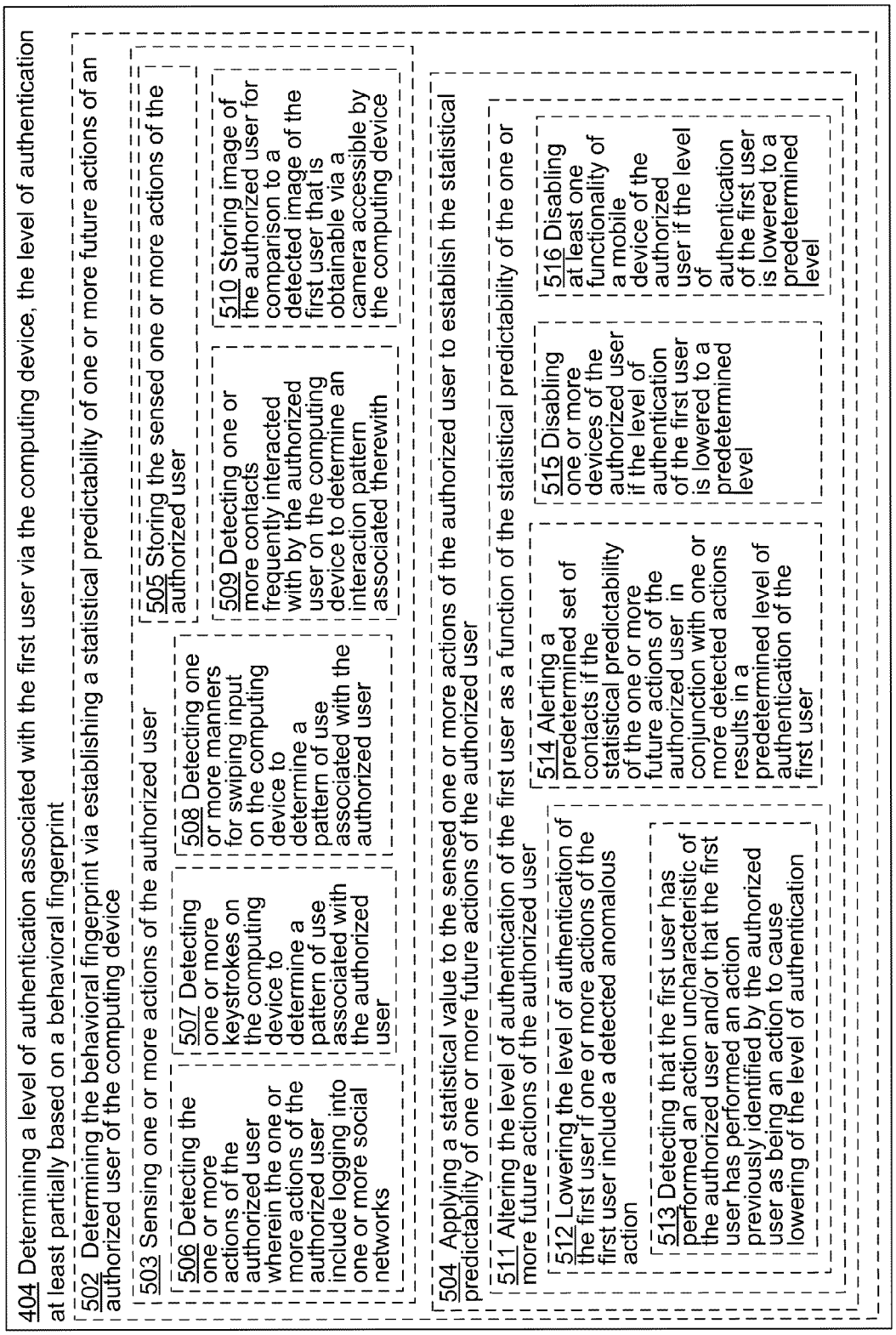
FIG. 5a is a high-level logic flowchart of a process depicting alternate implementations of an operation 404 of FIG. 4, in accordance with certain example embodiments.
Figure 5B:
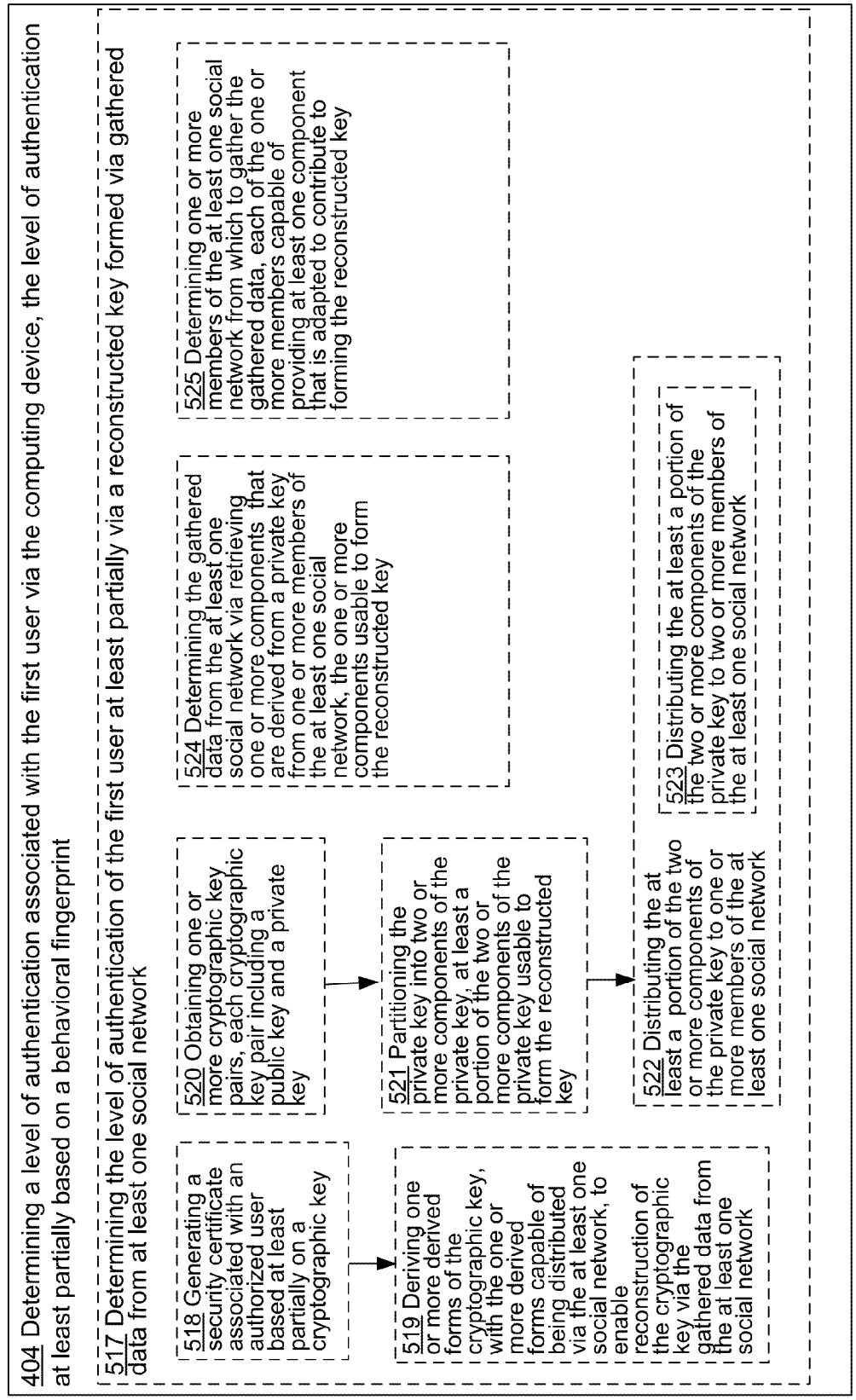
FIG. 5b is a high-level logic flowchart of a process depicting alternate implementations of an operation 404 of FIG. 4, in accordance with certain example embodiments.
Figure 5C:
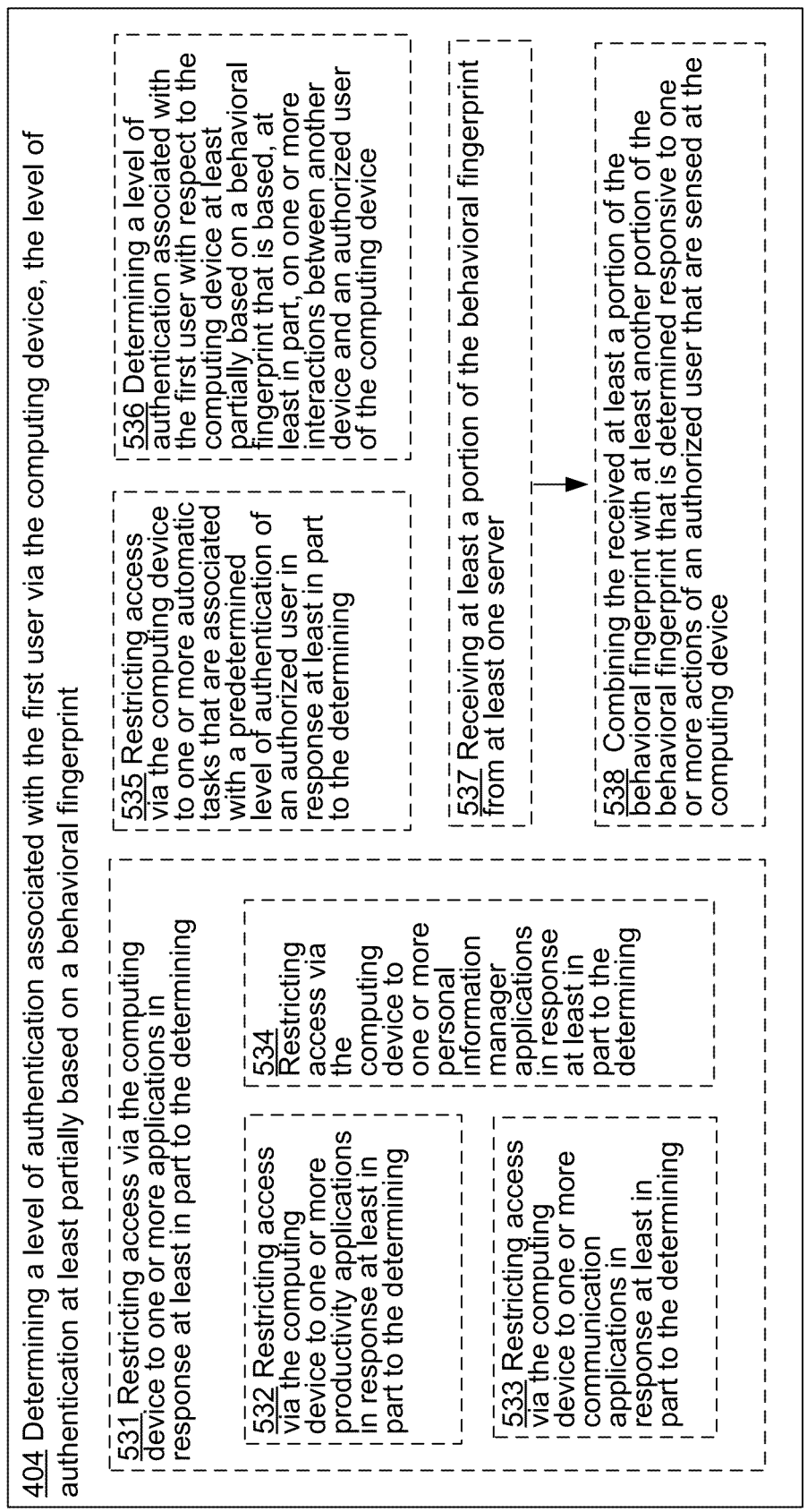
FIG. 5c is a high-level logic flowchart of a process depicting alternate implementations of an operation 404 of FIG. 4, in accordance with certain example embodiments.

As will be further described herein, a level of authentication operation 404 of FIG. 4 may be executed in a variety of different ways in various alternative implementations. FIG. 5a, 5b, or 5c, for example, illustrate at least some of the alternative ways that operation 404 of FIG. 4 may be executed in various alternative example implementations. For example, in various implementations, operation 404 of FIG. 4 may include an operation 502 for determining the behavioral fingerprint via establishing a statistical predictability of one or more future actions of an authorized user of the computing device as depicted in FIG. 5a. For instance, a behavioral fingerprint module 106/106a may determine a behavioral fingerprint of first user 20 by establishing that first user 20 is an authorized user (e.g., a user that has previously authenticated herself or himself, a user that was previously determined to be authentic, a combination thereof, etc.) of computing device 10 or by generating a behavioral fingerprint via fingerprint build/degradation module 314 or via fingerprint generation module 316. In certain example implementations, authentication may be accomplished when a user first registers a profile, account, etc. on a device (e.g., after a purchase or a 'hard' reset); authentication may be accomplished when/if one or more 'sign-ins' (e.g., entry of a password, PIN, pattern, a combination thereof, etc.) are performed by a user; authentication may be accomplished when/if one or more user ID/secret information combinations (e.g., entry of an account name, email address, individualized identification, a combination thereof, etc. along with a corresponding password, PIN, pattern, a combination thereof, etc.) are entered by a user; authentication may be accomplished if a device is used as part of a transaction that involves additional (e.g., non-virtual, multi-level, a combination thereof, etc.) authentication protocols, including but not limited to presenting a physical form of identification (e.g., a government-issued photo ID, copies of bills or financial statements, a combination thereof, etc.), entering multiple user ID/secret information combinations, a combination thereof, etc.; some combination of such authentications; and so forth. In certain example implementations, a behavioral fingerprint can include or be developed using statistical calculations that are based on prior actions to predict future actions of an authorized user. For instance, sensed actions may be correlated to frequency of occurrence (e.g., number of times per day or per hour), locations of occurrence (e.g., geographical or network locations), times of occurrence (e.g., between 8 and 9 am each morning), combinations thereof, etc.; different sensed actions that repeatedly occur together spatially or temporally may be cataloged (e.g., an authorized user buys coffee at a known location, consumes news from two known web sites, and then drives his/her car away from the known location); sensed actions that have a particular characteristic (e.g., a device is pressed with a known force when typed or swiped or held at a known angle when in use) may be recorded; combinations thereof; and so forth. Statistical analysis of such correlations, cataloged data, recorded characteristics, etc. may produce probabilistic likelihoods that a given action is to occur in the future at a particular frequency, at particular locations, at particular times, in conjunction with other actions, in a particular manner or way, a combination thereof, and so forth.

As further illustrated in FIG. 5a, in some example implementations, a level of authentication operation 502 may additionally or alternatively include an operation 503 for sensing one or more actions of an authorized user. For instance, sensors 120 or a level of authentication module 102/102a of a computing device 10 (e.g., of FIG. 1) may determine that first user 20 is an authorized user or may process sensed data for forming or updating a behavioral fingerprint based, at least in part, on data provided by one or more sensors 120 (e.g., a satellite positioning system (SPS) or other geographical-location-providing unit, a microphone, a camera, a touch sensor, a gyroscope, an accelerometer, an inertial measurement unit (IMU), a software sensor that detects electronic usage (e.g., websites visited, content presented, games played, people contacted, a combination thereof, etc.), combinations thereof, etc.).

Data from various types of sensors 120 may be used in order to determine a level of authentication of a computing device 10. For example, and as further illustrated in FIG. 5a, an operation 503 may be followed by an operation 504 for applying a statistical value (e.g., at least one datum relating to one or more occurrences of at least one action) to the sensed one or more actions of the authorized user to establish a statistical predictability of one or more future actions of an authorized user. For instance, a level of authentication module 102/102a of a computing device 10 of FIG. 1 may apply a statistical level determination module 218 (e.g., to apply a statistical value with a probabilistic approach such as a likelihood function or Bayesian analysis; to apply a statistical value with a stochastic mechanism such as a Gaussian function, normalization, or a correlation function; to apply a statistical value with a histogram or other data-conglomerating or data-organizing tool; any combination thereof, etc.) to actions taken by an authorized user having a behavioral fingerprint of a behavioral fingerprint library 170.

In some example implementations, operation 503 may include an operation 505 for storing the sensed one or more actions of the authorized user as further depicted in FIG. 5a. For instance, memory 114, which may include library of behavioral fingerprints 170 of a computing device 10 of FIG. 1, may store an indication of, a reference to, a summary of, a description of, etc. one or more actions sensed by sensors 120 or actions over a network, such as social network interactions. Additionally or alternatively, a computing device 10 may store one or more sensed actions remotely, such as at another device 60, at a server 30, a combination thereof, and so forth.

In the same or different example implementations, operation 503 may include an operation 506 for detecting the one or more actions of the authorized user wherein the one or more actions of the authorized user include logging into one or more social networks. For instance, a level of authentication module 102/102a of a computing device 10 of FIG. 1 may determine that first user 20 is operating computing device 10 as an authorized user and a communication application 166 comprises or is running a social network application. Data that reflects interactions with a social network application (e.g., blogs read, people contacted, pictures viewed, videos played, comments made (e.g., writing on a wall, sending a personal message to a particular person or particular people, sending a public message, etc.), comments responded to, content forwarded, content approved (e.g., liked, plus-oned, re-tweeted, etc.), people followed, combinations thereof, etc.) may be stored in behavioral fingerprint library 170.

In the same or alternative example implementations, operation 503 may include an operation 507 for detecting one or more keystrokes on the computing device to determine a pattern of use associated with the authorized user. For instance, a level of authentication module 102/102a of a computing device 10 of FIG. 1 may detect via movement sensors 202 (e.g., including touch or pressure sensors) one or more keystrokes on computing device 10 to determine a pattern of use (e.g., force applied generally or to particular keys, a speed of key presses, a cadence of key presses, a rhythm of key presses, a group or number of keys that are often pressed in succession more quickly than an overall typing speed, a location of finger contact on virtual keyboards, a combination thereof, etc.) associated with an authorized user.

In certain example implementations, an operation 503 may include an operation 508 for detecting one or more manners for swiping input on the computing device to determine a pattern of use associated with the authorized user as depicted in FIG. 5a. For instance, a level of authentication module 102/102a of a computing device 10 of FIG. 1 may detect via movement sensors 202 (e.g., including touch or pressure sensors) manners of swiping an input on computing device 10 to determine a pattern of use (e.g., swipes may exhibit a common length or particular lengths that vary based on context; swipes may exhibit a typical speed of finger movement; swipes may exhibit a frequent direction or angle of movement; swipes may exhibit a typical location on a screen—with respect to a top, middle, or bottom of a relevant targeted area, such as a whole displayed page of a multi-page document, or with respect to a precision of a visually-guided swipe zone, such as to unlock a screen; swipes may exhibit a recurring usage pattern in lieu of other device manipulation options, such as swiping in lieu of pressing a particular menu item or defined touch-sensitive zone to turn a page; any combination thereof; etc.) associated with an authorized user.

In certain example implementations, an operation 503 may include an operation 509 for detecting one or more contacts frequently interacted with by the authorized user on the computing device to determine an interaction pattern associated with the authorized user as depicted in FIG. 5a. For instance, a level of authentication module 102/102a of a computing device 10 of FIG. 1 may detect via social network library 302 an interaction pattern (e.g., an identity of one or more contacts interacted with, a particular program or social network used to interact with one or more contacts, a length of time each of one or more contacts is interacted with, an order of interaction between or among one or more contacts, whether interactions are to send communications to or receive communications from one or more contacts, whether multiples contacts are simultaneously interacted with, whether communications are commingled between or among one or more contacts—e.g. individual interactions or group interactions, whether a same one or more contacts are interacted with across multiple social networks, what type(s) of communications (e.g., phone call, email, text, instant message, posting, wall writing, tweeting, pinning, a combination thereof, etc.) are used with particular contacts, recurrences thereof, any combination thereof, etc.) associated with an authorized user.

In certain example implementations, an operation 503 may include an operation 510 which provides for storing at least one image of the authorized user for comparison to a detected image of the first user that is obtainable via a camera accessible by the computing device. For instance, a computing device 10 may use a behavioral fingerprint library 170 or an authorized user library 304 to store at least one image of an authorized user. A level of authentication module 102/102a or a behavioral fingerprint module 106/106a may compare (e.g., using facial recognition analysis) a stored image of an authorized user with an image of first user 20 that is obtained via a camera (e.g., one or more sensors 120, such as an image capturing device 204 or a camera 16; a camera that is coupled to a computing device 10 by wire; a camera that is coupled to a computing device 10 wirelessly; a camera that is owned or controlled by the first user 20; a camera that is owned or controlled by another entity, such as a friend or family member, a business associate, a store engaging in a transaction with computing device 10 or first user 20; a camera associated with a cash register; a camera associated with a security system; any combination thereof; etc.) accessible to computing device 10. A comparison of a stored image to a current image may reveal that first user 20 is statistically likely to be an authorized user or statistically unlikely to be an authorized user.

Referring to operation 504 (of FIG. 5a), in certain example implementations, an operation 504 can include operation 511 for altering the level of authentication of the first user as a function of the statistical predictability of the one or more future actions of the authorized user. For instance, a computing device 10 may alter (e.g., raise or lower a general or specific) level of authentication of a first user 20 using a level of authentication module 102/102a as a function of a statistical probability, which may be determined via a statistical level determination module 218 with regard to one or more potential future actions of an authorized user. For example, sensed current actions of a first user 20 may be considered with reference to a probabilistic likelihood of future actions by an authorized user, with the probabilistic likelihood derived from a statistical predictability of potential future actions. By way of example but not limitation, if sensed current action(s) match with likely future action(s), a level of authentication may be maintained or raised. If, on the other hand, sensed current action(s) fail to match with likely future action(s), a level of authentication may be maintained or lowered. A probabilistic strength of a likelihood of future actions may be considered when determining if action(s) match or when determining a resulting effect on a level of authentication.

In the same or different example implementations, operation 511 may include an operation 512 for lowering the level of authentication of the first user if one or more actions of the first user include a detected anomalous action as further depicted in FIG. 5a. For instance, an anomalous action detecting module 212 of a computing device 10 may detect an anomalous action with respect to use of computing device 10 during use of computing device 10 by first user 20 and may at least partially cause a level of authentication module 102/102a to lower a level of authentication (e.g., change a level of authentication such that one or more things (e.g., applications, files, contents, actions, whole devices, application features, a combination thereof, etc.) that were capable of being accessed, performed, acted upon, etc. are no longer capable of being accessed, performed, acted upon, etc. or have a reduced level of being accessed, performed, acted upon, etc.) with respect to first user 20.

In various example implementations, operation 512 for lowering the level of authentication of the first user if one or more actions of the first user include a detected anomalous action may include an operation 513 for detecting that the first user has performed an action uncharacteristic of the authorized user and/or that the first user has performed an action previously identified by the authorized user as being an action to cause lowering of the level of authentication. For instance, a computing device 10, a behavioral fingerprint library 170, or an anomalous activity library 306 may alert a level of authentication module 102/102a or a behavioral fingerprint library 106/106a of an anomalous action (e.g., an action that is statistically unlikely in comparison to those future actions having a determined statistically predictable likelihood in accordance with a behavioral fingerprint and/or an action that an authorized user has labeled as or otherwise indicated as being anomalous, such as trying to make a purchase over $20 or accessing a particular person's social networking profile, which indicated anomalous actions may be stored in anomalous activity library 306) that has been performed by a first user 20.

In certain example implementations, an operation 511 can include operation 514 for alerting a predetermined set of contacts if the statistical predictability of the one or more future actions of the authorized user in conjunction with one or more detected actions results in a predetermined level of authentication of the first user. For instance, a computing device 10 may alert a predetermined set of contacts (e.g., one or more people or groups of people participating in one or more social networks) via e.g. social network library 302 and network interface 112 if a statistical level determination module 218 determines that a statistical predictability of one or more future actions of an authorized user in conjunction with (e.g., in comparison to, based on at least one correlation including, a combination thereof, etc.) one or more detected actions (e.g., actions that are sensed contemporaneously or currently; actions that are sensed recently, such as from the present to a predetermined period of time in the past; actions that have been sensed since a most-recent authentication; actions leading up to an anomalous action; a combination thereof; etc.) results in a predetermined level of authentication (e.g., reaches a predetermined sufficiently low level of authentication, fails to reach a predetermined sufficiently high level of authentication, drops a predetermined level of authentication, a combination thereof, etc.) of a first user 20 (e.g., because a comparison of one or more detected actions by first user 20 fails to produce a sufficiently high level of correspondence with or does produce a sufficiently low level of correspondence with statistically predicted one or more future actions of an authorized user). A predetermined level of authentication determined for a first user 20 may comprise or correspond to a determination that first user 20 has stolen computing device 10, that first user 20 is on a list of users that are unauthorized (for use of computing device 10 generally or use of a particular feature/application/content/capability of computing device 10), that first user 20 has entered a particular number of incorrect passwords, that first user is not on a list of authorized users, a combination thereof, etc., which may result in a lowered level of authentication.

In certain example implementations, an operation 511 can include an operation 515 for disabling one or more devices of the authorized user if the level of authentication of the first user is lowered to a predetermined level. For instance, a computing device 10 may disable one or more devices (e.g., other devices 60, cars, locking devices, point-of-sale devices, cash dispensing devices, a combination thereof, etc.) for which computing device 10 has control if a level of authentication determined by level of authentication module 102/102a is altered to a lower predetermined level. The one or more devices can be configured to be automatically disabled without interference (e.g., confirmation, command input, verification, capability to belay disablement, warning, a combination thereof, etc.) by a first user 20 or an authorized user.

In certain example implementations, an operation 511 can include an operation 516 for disabling at least one functionality of a mobile device of the authorized user if the level of authentication of the first user is lowered to a predetermined level. For instance, a computing device 10 may disable at least one functionality of a mobile device (e.g., a mobile phone, a smart phone, a personal digital assistant (PDA), an e-reader, a laptop, a slate/tablet computer, a portable entertainment device, a combination thereof, etc.) when or if a level of authentication for a first user 20 that is determined by a level of authentication module 102/102a is altered to a lower predetermined level (e.g., lowered to a given absolute level of authentication, a level of authentication that is lowered by a given amount, a combination thereof, etc.). For certain example implementations, functionality that might be disabled may include, but is not limited to, making purchases, installing or starting or using apps generally or specifically-enumerated apps, communicating via social media, communicating with an entity that is not already of record (e.g., that is not already: listed in a device's contacts, previously-communicated with using some application, a combination thereof, etc.), visiting a web page that has not previously been visited (e.g., is not listed in a browsing history), visiting an adult-oriented web page, making international calls, downloading or streaming media, any combination thereof, and so forth. For certain example implementations, functionality that might not be disabled may include, but is not limited to, making emergency (e.g., 911) calls, making calls to one or more designated numbers (e.g., a number or an alternative number of an authorized user), communicating with one or more designated contacts (e.g., an email address, a text message destination, a social media outlet, etc. that is affiliated with an authorized user), using a mapping or navigating application, any combination thereof, and so forth. At least one functionality of a mobile device can be configured to be automatically disabled without interference (e.g., without confirmation, command input, verification, capability to belay disablement, a combination thereof, etc.) by a first user 20 or an authorized user.

For certain example embodiments, with reference now to FIG. 5b, operation 404 for determining a level of authentication associated with the first user via the computing device, the level of authentication at least partially based on a behavioral fingerprint can include an operation 517 for determining the level of authentication of the first user at least partially via a reconstructed key formed via gathered data from at least one social network. For instance, a computing device 10, a behavioral fingerprint library 170, or a cryptographic library 308 may receive key-related data from at least one social network, such as from one or more social networks stored in a social network library 302 to reconstruct at least one cryptographic key (e.g., at least part of an asymmetric key pair, such as a public/private key pair; at least one Triple DES or AES type cryptographic key; another cryptographic key type; a combination thereof; etc.). If a cryptographic key is reconstructed (e.g., rebuilt, reformed, regenerated, refashioned, recreated, reestablished, reformulated, reproduced, a combination thereof, etc.) to form a reconstructed key from gathered data from at least one social network, a level of authentication for a first user 20 may be established at a predetermined level or raised by a predetermined amount.

In certain example implementations, an operation 517 may include an operation 518 for generating a security certificate associated with an authorized user based at least partially on a cryptographic key. For instance, a cryptographic library 308 of a computing device 10 may generate a security certificate that is associated with an authorized user based at least partially on a cryptographic key, such as a triple DES or AES symmetric key, such as at least one key of a private/public asymmetric key pair, a combination thereof, and so forth. In doing so, computing device 10 may store a private portion or a public portion of a public/private key pair or another cryptographic key type.

Additionally or alternatively, operation 518 may be followed by an operation 519 for deriving one or more derived forms of the cryptographic key, with the one or more derived forms capable of being distributed via the at least one social network, to thereby enable reconstruction of the cryptographic key via the gathered data from the at least one social network. For instance, a cryptographic scheme based on a public/private key pair may use a private key to derive one or more derived forms of the private key (e.g., a derived form of a private key may be produced if a private key is partitioned, segmented, hashed, encrypted, encoded, rearranged, manipulated, a combination thereof, etc.) that can be distributed to one or more users/members/friends on at least one social network, such as one or more social networks stored via a social network library 302. At least one of the one or more derived forms of a cryptographic key can later be gathered from the users/members/friends that belong to the at least one social network or used to reconstruct the cryptographic key (e.g., at least one derived form of the cryptographic key may be retrieved from those that belong to the at least one social network using the at least one social network even if it were previously distributed outside of the social network, at least one derived form of the cryptographic key that was distributed to those that belong to the at least one social network via the at least one social network may be retrieved from those that belong to the at least one social network separately from the at least one social network, at least one derived form of the cryptographic may be both distributed and retrieved via the at least one social network, etc.).

In certain example implementations, an operation 517 for determining the level of authentication of the first user at least partially via a reconstructed key formed via gathered data from at least one social network may include an operation 520 for obtaining one or more cryptographic key pairs, each cryptographic key pair including a public key and a private key. For instance, a cryptographic library 308 may obtain one or more cryptographic key pairs, such as at least one private key for decrypting information and at least one public key for encrypting information. A cryptographic key pair may be generated locally or obtained from a remote source, such as a server 30, a certificate authority, a combination thereof, and so forth.

Additionally or alternatively, an operation 520 can be followed by an operation 521 for partitioning the private key into two or more components of the private key, at least a portion of the two or more components of the private key usable to form the reconstructed key. For instance, a private key of a cryptographic key pair may be partitioned (e.g., divided, segmented, separated into "n" components, separated into equal-sized components, separated into unequal-sized components, separated into "n" bins by selecting every nth character for each bin, any combination thereof, etc. ("n" representing an integer)) into at least two components. A least a portion of the two or more components of the private key may be used to form the reconstructed key (e.g., by combining the components, by concatenating the components, by interlacing the components, any combination thereof, etc.).

Additionally or alternatively, an operation 521 can be followed by an operation 522 for distributing the at least a portion of the two or more components of the private key to one or more members of the at least one social network. For instance, a cryptographic library 308 may distribute via a network interface 112 at least a portion of the two or more components of the private key to one or more members of at least one social network, which members may belong to one or more social networks as stored by a social network library 302. Distribution may be effectuated, by way of example but not limitation, using general communication protocols or features offered by at least one social network, using cryptographic-key-specific communication protocols or features or APIs provided by at least one social network, using communication protocols or options that are out-of-band from the social network (e.g., using email addresses garnered via the at least one social network), any combination thereof, and so forth. Gathering of cryptographic key data from at least one social network may be effected, for example, using any one or more of the communication protocols, features, options, etc. that are described above with reference to distribution with respect to social network(s).

In certain example implementations, an operation 522 for distributing the at least a portion of the two or more components of the private key to one or more members of the at least one social network can include an operation 523 for distributing the at least a portion of the two or more components of the private key to two or more members of the at least one social network. For instance, a cryptographic library 308 may distribute via a network interface 112 at least a portion of the two or more components of the private key to two or more members of a social network. By way of example but not limitation, if partitioned components of a private key are distributed to one or two or more than two members of a social network, all or fewer than all partitioned components of a private key may be distributed to member(s) of a social network. Each recipient member may receive one or more than one component of a private key. Each component of a private key may be sent to one member of a social network or multiple members of a social network (e.g., duplicate copies of private key components may be distributed to multiple social network members for redundancy in case a designated member is unavailable when a private key component is to be requested or otherwise retrieved). One or more components of a given private key may be distributed to social network member(s) without redundant duplication while other one or more components of the given private key may be distributed with redundant duplication. Other partitioned key component approaches may alternatively be employed.

In certain example implementations, an operation 517 for determining the level of authentication of the first user at least partially via a reconstructed key formed via gathered data from at least one social network can further include an operation 524 for determining the gathered data from the at least one social network via retrieving one or more components that are derived from a private key from one or more members of the at least one social network, the one or more components usable to form the reconstructed key. For instance, a cryptographic library 308 may via network interface 112 gather data including one or more components that are derived from a private key from one or more members of the at least one social network, which members may be stored with a social network library 302 or remotely (e.g., at a server related to a theft monitoring/recovery service, at a server related to at least one social network, at a server managing behavioral fingerprints, a combination thereof, etc.). Gathered data including one or more components derived from a private key may be usable to form a reconstructed key that corresponds, e.g., to a private key of a cryptographic public/private key pair. Data including one or more components derived from a private key may be gathered using general social network communication features (e.g., sending messages, writing privately on a wall, sending a private tweet, a combination thereof, etc.), using at least one application programming interface (API) of a social network that is tailored to provide cryptographic key data, using contact information acquired via a social network, using contact information acquired via a social network and a communication path that is out-of-band from the social network, any combination thereof, and so forth. For example implementations, a computing device 10 may retrieve at least one component that is derived from a private key from one or more members of at least one social network: automatically (e.g., without explicit contemporaneous approval by a social network member) via a social network interface, after approval by a social network member, by requesting verification from a social network member that an authorized user of computing device 10 is believed to be in current possession of computing device 10, any combination thereof, and so forth. Two or more social network members that are capable of providing a same component usable to at least partially form a reconstructed key may be contacted to improve a likelihood that gathered data may be gathered from at least one member for each component to be retrieved. By way of example but not limitation, a request to retrieve key components may be sent via e.g. at least one private social network message to members of at least one social network individually or as a group.

In certain example implementations, an operation 517 can include an operation 525 for determining one or more members of the at least one social network from which to gather the gathered data, each of the one or more members capable of providing at least one component that is adapted to contribute to forming the reconstructed key. For instance, a computing device 10 may determine one or more members of at least one social network via a social network library 302 from which to gather (e.g., retrieve, request, acquire, obtain, amalgamate, reclaim, a combination thereof, etc.), with each of the one or more members being capable of providing at least one component that is adapted to contribute to forming a reconstructed key via a cryptographic library 308 (e.g., contributing by providing at least a portion of cryptographic key, contributing by indicating a cryptographic process for regenerating a key, contributing by providing an input or modifier to a process for inversely deriving (e.g., decoding, de-interlacing, etc.) a key, contributing by indicating at least one avenue for recovering or rebuilding a key, contributing by providing an address or pointer to any of the above, a combination thereof, etc.). By way of example but not limitation, a determination of one or more members of at least one social network may be effected by a computing device 10 by retrieving a stored group of social network members (e.g. trusted social network members from memory 114), may be effected by a computing device 10 by retrieving identities (e.g., names, contact information, social network communication links or identities, a combination thereof, etc.) of members from at least one social network, may be effected by a computing device 10 by retrieving identified members from at least one server 30, any combination thereof, and so forth.

For certain example embodiments, as illustrated in FIG. 5c, an operation 404 may include an operation 531 for restricting access via the computing device to one or more applications in response at least in part to the determining. For instance, an access restriction module 104/104a of a computing device 10 may restrict access via computing device 10 to (e.g., limit a user to using, exclude a user from using, limit a user to using a portion of but not all features of, exclude a user from using a portion of but not all features of, a combination thereof, etc.) one or more items (e.g., electronic documents including productivity documents such as word processing documents, spreadsheets, presentation slides, a combination thereof, etc.; electronic documents including electronic messages such as emails, instant messages, social network messages, comments—including but not limited to those associated with a social network, Twitter™ messages—aka Tweets, a combination thereof, etc.; image files, audio files, video files, a combination thereof, etc.; applications; passwords; portion(s) of an operating system; one or more features (Wi-Fi, wireless broadband, internet, payment services, order services, etc.) of a device; combinations thereof; and so forth) in response to the determining by at least restricting access to the one or more items that were or would be accessible by an authorized user (e.g., was or would be accessible, visible, editable, commentable, usable, a combination thereof, etc. by the authorized user) when or if the authorized user was or is using the computing device 10. For instance, an application access restriction module 264 (e.g., of FIG. 2*c*) of a computing device 10 may restrict access via computing device 10 to (e.g., limit a user to using, exclude a user from using, limit a user to using a portion of but not all features of, exclude a user from using a portion of but not all features of, a combination thereof, etc.) one or more applications 160 (e.g., a productivity application such as a word processing application, a communication application such as an IM application, a gaming application, a local application, a web application—e.g. that executes at least partially within a browser or remotely on a server, a native application, a remote application—e.g. that executes at least partially in the cloud, a combination thereof, and so forth) in response to the determining. In some example cases, such restrictions to one or more applications 160 may be related to restricting use of one or more functionalities of the one or more applications 160 (e.g., content viewing may be allowed but editing may be blocked, viewing a social network site or stream may be permitted but adding input or comments may be prevented, local usage may be allowed but internet-connected usage may be barred, application usage may be freely permitted until an application requires additional funds to continue or change capabilities—which funds disbursement or payment may be disallowed, a combination thereof, etc.). In some example embodiments, access can be complete; for instance, an access restricting module 104/104*a* including a no access module 234 (e.g., of FIG. 2*c*) of a computing device 10 may restrict access to one or more items that were or would be accessible by a first user 20 if the first user 20 were an authorized user of computing device 10 by having the no access module 234 provide no access (e.g., completely hiding or erasing any indications of the existence of the one or more items, renaming or disguising a true nature of an item, blocking viewing of content, preventing launch of an application, a combination thereof, etc.) to the one or more items that were or would be accessible by an authorized user who was or may be subsequently using the computing device 10.

As further illustrated in FIG. 5*c*, by way of example but not limitation, operation 531 may include one or more additional operations in various alternative implementations. In certain example implementations, operation 531 may include an operation 532 for restricting access via the computing device to one or more productivity applications in response at least in part to the determining. For instance, an access restricting module 104/104*a* including a document access restricting module 254 (see FIG. 2*c*) of a computing device 10 may restrict access to one or more productivity applications (e.g., document creation/modifying applications, communication applications, image or video creation/modifying applications, graphical creation/modifying applications, a combination thereof, etc.) that were or would be accessible by a first user 20 if first user 20 was or is determined to be an authorized user of the computing device 10 by having a productivity document access restricting module 255 provide restricted access (e.g., no access, read-only/view-only access, limited functional access if the one or more productivity applications includes one or more applications 160, a combination thereof, etc.) to the one or more items that were or would be accessible by an authorized user using the computing device 10.

In certain example implementations, an operation 531 may include an operation 533 for restricting access via the computing device to one or more communication applications in response at least in part to the determining. For instance, a communication application access restriction module 266 (e.g., of FIG. 2*c*) of a computing device 10 may restrict access via the computing device 10 to one or more communication applications (e.g., an email application; an instant messaging or IM application; a text messaging application; a social-networking application that enables transmission/reception/exchange of communications, such as messages, comments, tweets, retweets, postings, pinnings, etc.; an application that enables posting of comments, tweets, text, images, videos, etc.; a voice or video over internet protocol (IP) application; an application that enables completion and forwarding of forms; any combination thereof; and so forth) in response to the determining.

In certain example implementations, an access restricting operation 531 for restricting access via the computing device to one or more applications in response to the determining may include an operation 534 for restricting access via the computing device to one or more personal information manager applications in response at least in part to the determining. For instance, a personal information manager application access restriction module 267 (e.g., of FIG. 2*c*) of a computing device 10 may restrict access via computing device 10 to one or more personal information manager applications (e.g., Microsoft® Outlook™; an application that contains information about contacts, such as a telephone number or email directory; an application that contains information about people in at least one social network group, such as a friends, followers, or circle companions; an application that provides access to a person's schedule; an application that provides access to a person's upcoming tasks; an application that provides access to a person's likely current geographical location; a web or cloud-based application that provides access to any of the above; a combination thereof; etc.) in response to the determining.

In certain example implementations, as further illustrated in FIG. 5*c*, an operation 404 may include an operation 535 for restricting access via the computing device to one or more automatic tasks that are associated with a predetermined level of authentication of an authorized user in response at least in part to the determining. For instance, a no automatic task functionality module 235 (e.g., of FIG. 2*c*) of a computing device 10 may prevent, via the computing device 10 and in response at least in part to the determining, one or more automatic tasks (e.g., automatic email or other communication checking/retrieval/displaying, automatic door unlocking or opening, automatic car starting, automatic purchase approval or authorization, a combination thereof, etc.) from being performed based at least partially on a level of authentication. By way of example only, automatic door unlocking or car starting may be restricted if a level of authentication falls below a highest level, automatic purchase authorization may be restricted if a level of authentication decreases to another lower level, and automatic communication display may be restricted if a level of authentication decreases to yet another lower level, and so forth.

For certain example embodiments, as further illustrated in FIG. 5*c*, an operation 404 may include an operation 536 for determining a level of authentication associated with the first user with respect to the computing device at least partially based on a behavioral fingerprint that is based, at least in part, on one or more interactions between another device and an authorized user of the computing device. By way of example but not limitation, a level of authentication associated with a first user 20 with respect to a computing device 10 may be determined at least partially based on a behavioral fingerprint 40, which behavioral fingerprint 40 may be based, at least in part, on one or more interactions (e.g., general usage of, swipes on, typing with, manipulations of features, physical transport of, application accessing, internet-location accessing, people contacted, social network accessing, social network monitoring, passwords entered, a combination thereof, etc.) between a device 60 and an authorized user of computing device 10. For instance, behavioral fingerprint characteristics obtained with respect to a device 60 may be applied with respect to a computing device 10.

For certain example embodiments, as further illustrated in FIG. 5c, an operation 404 may include an operation 537 for receiving at least a portion of the behavioral fingerprint from at least one server. By way of example but not limitation, a computing device 10 may receive at least a portion of a behavioral fingerprint 40 from at least one server 30, from a cloud-based service, a combination thereof, and so forth. For instance, at least a portion of a behavioral fingerprint 40 (e.g., a complete behavioral fingerprint, a part of a behavioral fingerprint, updates to a behavioral fingerprint, changes to a behavioral fingerprint, augmentations to a behavioral fingerprint, a combination thereof, etc.) that is used to at least partially determine a level of authentication at a computing device 10 may be received from a server 30 in the cloud. A received at least a portion of a behavioral fingerprint 40 may comprise behavioral characteristics detected in the cloud; may comprise behavioral characteristics detected at another device 60; may comprise behavioral characteristics that are amended, augmented, transformed, edited, a combination thereof, etc. in the cloud at one server 30 (e.g., but attained in the cloud from another device 60, a computing device 10, another server 30, a combination thereof, etc.); any combination thereof; and so forth.

As further illustrated in FIG. 5c, in some example implementations, operation 404 may include, following an operation 537, an operation 538 for combining the received at least a portion of the behavioral fingerprint with at least another portion of the behavioral fingerprint that is determined responsive to one or more actions of an authorized user that are sensed at the computing device. By way of example but not limitation, a computing device 10 may combine a received at least a portion of a behavioral fingerprint 40 with at least another portion of a behavioral fingerprint 40, with the other portion determined responsive to one or more actions of an authorized user that are sensed at computing device 10. For instance, a local version of a behavioral fingerprint 40 at a computing device 10 may be, updated, augmented, partially replaced, changed, a combination thereof, etc. with behavioral characteristics received from the cloud. Additionally or alternatively, a computing device 10 may send at least changes, updates, augmentations, combinations thereof, etc. of or to a local version of a behavioral fingerprint 40 to at least one server 30 in the cloud. A combined behavioral fingerprint 40 may be used to determine a level of authentication for a first user 20 going forward (e.g., after a combination of a local behavioral fingerprint and a cloud behavioral fingerprint).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A computationally-implemented system, comprising:
   circuitry for determining that a first user of a computing device is associated with the computing device; and
   circuitry for determining a level of authentication associated with the first user via the computing device, the level of authentication at least partially based on a behavioral fingerprint, including at least circuitry for determining the behavioral fingerprint via establishing a statistical predictability of one or more future actions of an authorized user of the computing device.

2. The computationally-implemented system of claim 1, further comprising:
    circuitry for determining via the computing device that the first user has made a request for performance of a task; and
    circuitry for performing the task automatically without interference by the first user as a function of the level of authentication associated with the first user.

3. The computationally-implemented system of claim 1, wherein the circuitry for determining a level of authentication associated with the first user via the computing device, the level of authentication at least partially based on a behavioral fingerprint comprises:
    circuitry for restricting access via the computing device to one or more applications in response at least in part to the determining a level of authentication.

4. The computationally-implemented system of claim 3, wherein the circuitry for restricting access via the computing device to one or more applications in response at least in part to the determining a level of authentication comprises:
    circuitry for restricting access via the computing device to one or more productivity applications in response at least in part to the determining a level of authentication.

5. The computationally-implemented system of claim 3, wherein the circuitry for restricting access via the computing device to one or more applications in response at least in part to the determining a level of authentication comprises:
    circuitry for restricting access via the computing device to one or more communication applications in response at least in part to the determining a level of authentication.

6. The computationally-implemented system of claim 3, wherein the circuitry for restricting access via the computing device to one or more applications in response at least in part to the determining a level of authentication comprises:
    circuitry for restricting access via the computing device to one or more personal information manager applications in response at least in part to the determining a level of authentication.

7. The computationally-implemented system of claim 1, wherein the circuitry for determining a level of authentication associated with the first user via the computing device, the level of authentication at least partially based on a behavioral fingerprint comprises:
    circuitry for restricting access via the computing device to one or more automatic tasks that are associated with a predetermined level of authentication of an authorized user in response at least in part to the determining a level of authentication.

8. The computationally-implemented system of claim 1, wherein the circuitry for determining a level of authentication associated with the first user via the computing device, the level of authentication at least partially based on a behavioral fingerprint comprises:
    circuitry for receiving at least a portion of the behavioral fingerprint from at least one server.

9. The computationally-implemented system of claim 8, wherein the circuitry for determining a level of authentication associated with the first user via the computing device, the level of authentication at least partially based on a behavioral fingerprint comprises:
    circuitry for combining the received at least a portion of the behavioral fingerprint with at least another portion of the behavioral fingerprint that is determined responsive to one or more actions of the authorized user that are sensed at the computing device.

10. The computationally-implemented system of claim 1, wherein the circuitry for determining the behavioral fingerprint via establishing a statistical predictability of one or more future actions of an authorized user of the computing device comprises:
    circuitry for sensing one or more actions of the authorized user; and
    circuitry for applying a statistical value to the sensed one or more actions of the authorized user to establish the statistical predictability of one or more future actions of the authorized user.

11. The computationally-implemented system of claim 10, wherein the circuitry for sensing one or more actions of the authorized user comprises:
    circuitry for storing the sensed one or more actions of the authorized user.

12. The computationally-implemented system of claim 10, wherein the circuitry for sensing one or more actions of the authorized user comprises:
    circuitry for detecting the one or more actions of the authorized user wherein the one or more actions of the authorized user include logging into one or more social networks.

13. The computationally-implemented system of claim 10, wherein the circuitry for sensing one or more actions of the authorized user comprises:
    circuitry for detecting one or more keystrokes on the computing device to determine a pattern of use associated with the authorized user.

14. The computationally-implemented system of claim 10, wherein the circuitry for sensing one or more actions of the authorized user comprises:
    circuitry for detecting one or more manners for swiping input on the computing device to determine a pattern of use associated with the authorized user.

15. The computationally-implemented system of claim 10, wherein the circuitry for sensing one or more actions of the authorized user comprises:
    circuitry for detecting one or more contacts frequently interacted with by the authorized user on the computing device to determine an interaction pattern associated with the authorized user.

16. The computationally-implemented system of claim 10, wherein the circuitry for sensing one or more actions of the authorized user comprises:
    circuitry for storing at least one image of the authorized user for comparison to a detected image of the first user that is obtainable via a camera accessible by the computing device.

17. The computationally-implemented system of claim 10, wherein the circuitry for applying a statistical value to the sensed one or more actions of the authorized user to establish the statistical predictability of one or more future actions of the authorized user comprises:
    circuitry for altering the level of authentication associated with the first user as a function of the statistical predictability of the one or more future actions of the authorized user.

18. The computationally-implemented system of claim 17, wherein the circuitry for altering the level of authentication associated with the first user as a function of the statistical predictability of the one or more future actions of the authorized user comprises:

circuitry for lowering the level of authentication associated with the first user if one or more actions of the first user includes a detected anomalous action.

19. The computationally-implemented system of claim 18, wherein the circuitry for lowering the level of authentication associated with the first user if one or more actions of the first user includes a detected anomalous action comprises:
    circuitry for detecting that the first user has performed an action uncharacteristic of the authorized user and/or that the first user has performed an action previously identified by the authorized user as being an action to cause lowering of the level of authentication.

20. The computationally-implemented system of claim 17, wherein the circuitry for altering the level of authentication associated with the first user as a function of the statistical predictability of the one or more future actions of the authorized user comprises:
    circuitry for alerting a predetermined set of contacts if the statistical predictability of the one or more future actions of the authorized user in conjunction with one or more detected actions results in a predetermined level of authentication associated with the first user.

21. The computationally-implemented system of claim 17, wherein the circuitry for altering the level of authentication associated with the first user as a function of the statistical predictability of the one or more future actions of the authorized user comprises:
    circuitry for disabling one or more devices of the authorized user if the level of authentication associated with the first user is lowered to a predetermined level.

22. The computationally-implemented system of claim 17, wherein the circuitry for altering the level of authentication associated with the first user as a function of the statistical predictability of the one or more future actions of the authorized user comprises:
    circuitry for disabling at least one functionality of a mobile device of the authorized user if the level authentication of associated with the first user is lowered to a predetermined level.

23. A computationally-implemented system, comprising:
    circuitry for determining that a first user of a computing device is associated with the computing device; and
    circuitry for determining a level of authentication associated with the first user via the computing device, the level of authentication at least partially based on a behavioral fingerprint, including at least circuitry for determining the level of authentication associated with the first user at least partially via a reconstructed key formed via gathered data from at least one social network.

24. The computationally-implemented system of claim 23, wherein the circuitry for determining the level of authentication associated with the first user at least partially via a reconstructed key formed via gathered data from at least one social network comprises:
    circuitry for generating a security certificate associated with an authorized user based at least partially on a cryptographic key; and
    circuitry for deriving one or more derived forms of the cryptographic key, with the one or more derived forms capable of being distributed via the at least one social network, to enable reconstruction of the cryptographic key via the gathered data from the at least one social network.

25. The computationally-implemented system of claim 23, wherein the circuitry for determining the level of authentication associated with the first user at least partially via a reconstructed key formed via gathered data from at least one social network comprises:
    circuitry for obtaining one or more cryptographic key pairs, each cryptographic key pair including a public key and a private key;
    circuitry for partitioning the private key into two or more components of the private key, at least a portion of the two or more components of the private key usable to form the reconstructed key; and
    circuitry for distributing the at least a portion of the two or more components of the private key to one or more members of the at least one social network.

26. The computationally-implemented system of claim 25, wherein the circuitry for distributing the at least a portion of the two or more components of the private key to one or more members of the at least one social network comprises:
    circuitry for distributing the at least a portion of the two or more components of the private key to two or more members of the at least one social network.

27. The computationally-implemented system of claim 23, wherein the circuitry for determining the level of authentication associated with the first user at least partially via a reconstructed key formed via gathered data from at least one social network comprises:
    circuitry for determining the gathered data from the at least one social network via retrieving one or more components that are derived from a private key from one or more members of the at least one social network, the one or more components usable to form the reconstructed key.

28. The computationally-implemented system of claim 23, wherein the circuitry for determining the level of authentication associated with the first user at least partially via a reconstructed key formed via gathered data from at least one social network comprises:
    circuitry for determining one or more members of the at least one social network from which to gather the gathered data, each of the one or more members capable of providing at least one component that is adapted to contribute to forming the reconstructed key.

29. A computationally-implemented system, comprising:
    circuitry for determining that a first user of a computing device is associated with the computing device; and
    circuitry for determining a level of authentication associated with the first user via the computing device, the level of authentication at least partially based on a behavioral fingerprint, including at least circuitry for determining a level of authentication associated with the first user with respect to the computing device at least partially based on a behavioral fingerprint that is based, at least in part, on one or more interactions between another device and an authorized user of the computing device.

30. A computationally-implemented method, comprising:
    determining that a first user of a computing device is associated with the computing device; and
    determining a level of authentication associated with the first user via the computing device, the level of authentication at least partially based on a behavioral fingerprint including at least determining the behavioral fingerprint via establishing a statistical predictability of one or more future actions of an authorized user of the computing device.

31. At least one processor-accessible medium bearing processor-executable instructions, the processor-executable instructions comprising:

one or more instructions for determining that a first user of a computing device is associated with the computing device; and one or more instructions for determining a level of authentication associated with the first user via the computing device, the level of authentication at least partially based on a behavioral fingerprint, including at least one or more instructions for determining the behavioral fingerprint via establishing a statistical predictability of one or more future actions of an authorized user of the computing device.

32. A computationally-implemented method, comprising:

determining that a first user of a computing device is associated with the computing device; and determining a level of authentication associated with the first user via the computing device, the level of authentication at least partially based on a behavioral fingerprint, including at least determining the level of authentication associated with the first user at least partially via a reconstructed key formed via gathered data from at least one social network.

33. At least one processor-accessible medium bearing processor-executable instructions, the processor-executable instructions comprising:

one or more instructions for determining that a first user of a computing device is associated with the computing device; and one or more instructions for determining a level of authentication associated with the first user via the computing device, the level of authentication at least partially based on a behavioral fingerprint, including at least one or more instructions for determining the level of authentication associated with the first user at least partially via a reconstructed key formed via gathered data from at least one social network.

34. A computationally-implemented method, comprising:

determining that a first user of a computing device is associated with the computing device; and determining a level of authentication associated with the first user via the computing device, the level of authentication at least partially based on a behavioral fingerprint, including at least determining a level of authentication associated with the first user with respect to the computing device at least partially based on a behavioral fingerprint that is based, at least in part, on one or more interactions between another device and an authorized user of the computing device.

35. At least one processor-accessible medium bearing processor-executable instructions, the processor-executable instructions comprising:

one or more instructions for determining that a first user of a computing device is associated with the computing device; and one or more instructions for determining a level of authentication associated with the first user via the computing device, the level of authentication at least partially based on a behavioral fingerprint, including at least one or more instructions for determining a level of authentication associated with the first user with respect to the computing device at least partially based on a behavioral fingerprint that is based, at least in part, on one or more interactions between another device and an authorized user of the computing device.

* * * * *

UNITED STATES PATENT AND TRADEMARK OFFICE
CERTIFICATE OF CORRECTION

| | | |
|---|---|---|
| PATENT NO. | : 8,713,704 B2 | Page 1 of 1 |
| APPLICATION NO. | : 13/475564 | |
| DATED | : April 29, 2014 | |
| INVENTOR(S) | : Davis et al. | |

It is certified that error appears in the above-identified patent and that said Letters Patent is hereby corrected as shown below:

In the Claims

At Column 39, Line 37, Claim 22, please replace "...if the level authentication of associated..." with --...if the level of authentication associated...--

Signed and Sealed this
Twenty-first Day of October, 2014

Michelle K. Lee
*Deputy Director of the United States Patent and Trademark Office*